United States Patent
Xu et al.

(10) Patent No.: US 10,215,918 B2
(45) Date of Patent: Feb. 26, 2019

(54) SUBWAVELENGTH PHOTONIC CRYSTAL WAVEGUIDE IN OPTICAL SYSTEMS

(71) Applicants: Xiaochuan Xu, Austin, TX (US); Ray T. Chen, Austin, TX (US)

(72) Inventors: Xiaochuan Xu, Austin, TX (US); Ray T. Chen, Austin, TX (US)

(73) Assignee: Omega Optics, Inc., Austin, TX (US)

( * ) Notice: Subject to any disclaimer, the term of this patent is extended or adjusted under 35 U.S.C. 154(b) by 0 days.

(21) Appl. No.: 15/281,888

(22) Filed: Sep. 30, 2016

(65) Prior Publication Data

US 2017/0146738 A1 May 25, 2017

Related U.S. Application Data

(63) Continuation-in-part of application No. 14/951,464, filed on Nov. 24, 2015, now Pat. No. 9,563,016.

(51) Int. Cl.
| | |
|---|---|
| *G02B 6/122* | (2006.01) |
| *G02B 6/10* | (2006.01) |
| *G02B 6/125* | (2006.01) |
| *G02F 1/01* | (2006.01) |
| *G02F 1/365* | (2006.01) |
| *G02B 6/12* | (2006.01) |
| G02B 6/293 | (2006.01) |
| G02B 6/34 | (2006.01) |

(52) U.S. Cl.
CPC ........... *G02B 6/1225* (2013.01); *G02B 6/107* (2013.01); *G02B 6/125* (2013.01); *G02B 6/12007* (2013.01); *G02B 6/1228* (2013.01); *G02F 1/0147* (2013.01); *G02F 1/365* (2013.01); G02B 6/29338 (2013.01); G02B 6/29395 (2013.01); G02B 6/34 (2013.01)

(58) Field of Classification Search
CPC .... G02B 6/125; G02B 6/1225; G02B 6/1228; G02B 6/29395; G02F 1/0147; G02F 1/365

See application file for complete search history.

(56) References Cited

U.S. PATENT DOCUMENTS

| | | | |
|---|---|---|---|
| 2007/0172183 A1* | 7/2007 | Wang | B82Y 20/00 385/125 |
| 2013/0121633 A1* | 5/2013 | Painter | G02B 26/001 385/14 |
| 2014/0325827 A1* | 11/2014 | Lipson | G02B 6/125 29/592 |

* cited by examiner

*Primary Examiner* — Sung Pak
*Assistant Examiner* — Hoang Tran
(74) *Attorney, Agent, or Firm* — Taboada Law Firm, PLLC; John M. Taboada

(57) ABSTRACT

An optical system is disclosed. The optical system comprising: a substrate; and a subwavelength photonic crystal waveguide atop the substrate, wherein the subwavelength photonic crystal waveguide comprises a periodic one or two-dimensional array of two or more interleaved dielectric pillars; wherein the periodicity of the one or two-dimensional array is constant, a combination of two or more periods, or random; wherein the one or two-dimensional array is substantially linear or curved; wherein each of the pillars of the one or two-dimensional array is at least one of a triangular prism, a trapezoidal prism, an elliptic cylinder, a cylinder, a tube, a frustum, a pyramid, a trapezoidal prism, and an asymmetric frustum; and wherein each of the pillars of the one or two-dimensional array comprises a solid, liquid, and/or gas. Other embodiments are described and claimed.

22 Claims, 45 Drawing Sheets

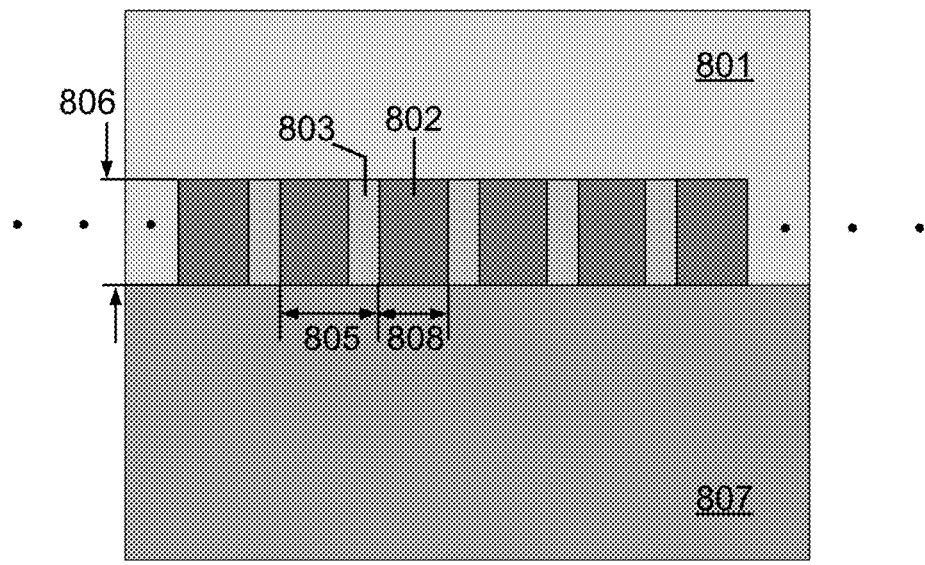
Fig. 8B
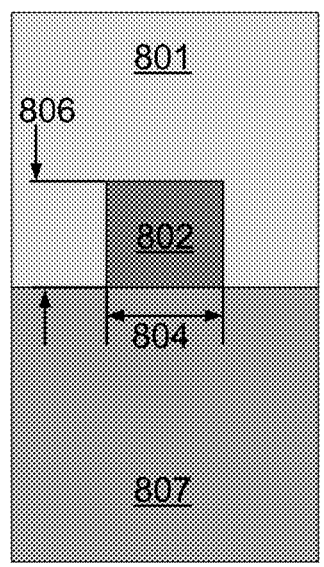 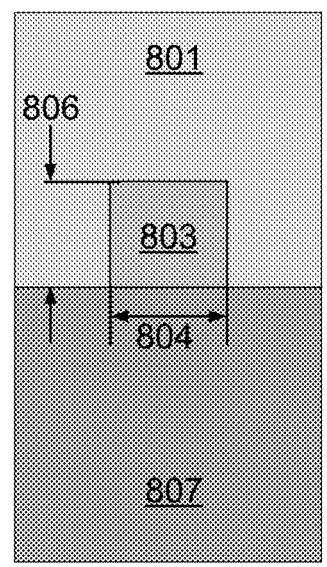
Fig. 8C          Fig. 8D

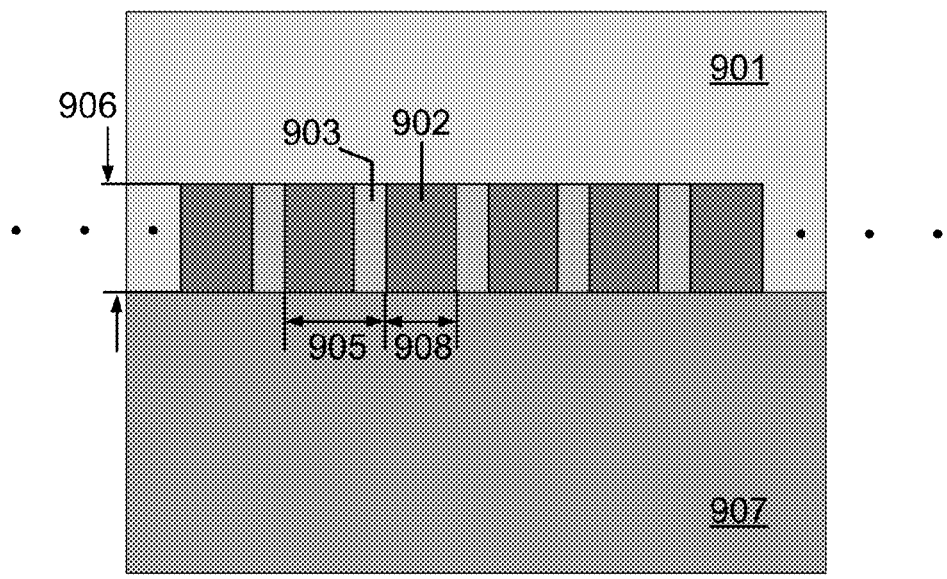
Fig. 9B
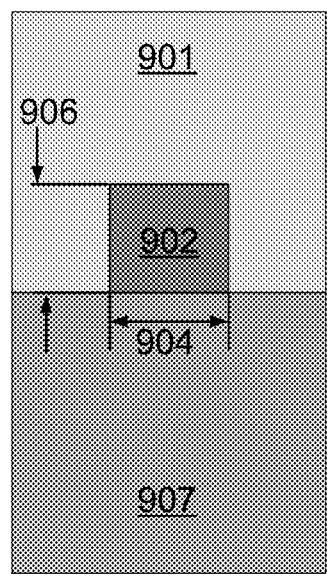 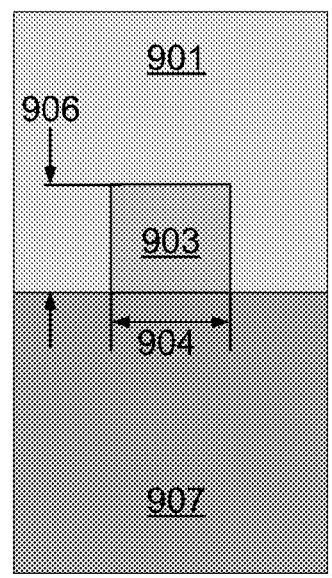
Fig. 9C  Fig. 9D

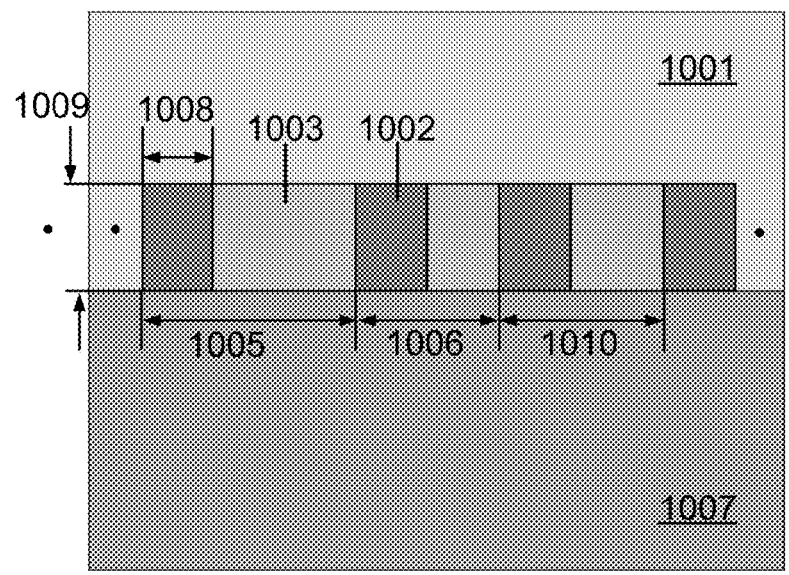
*Fig. 10B*
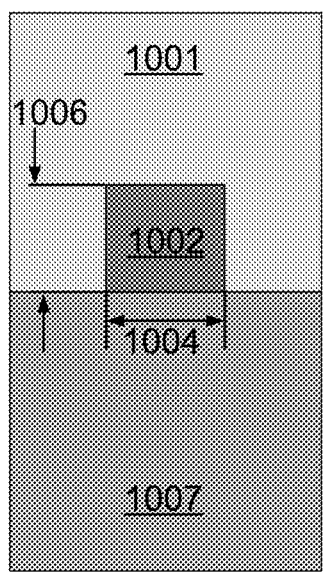 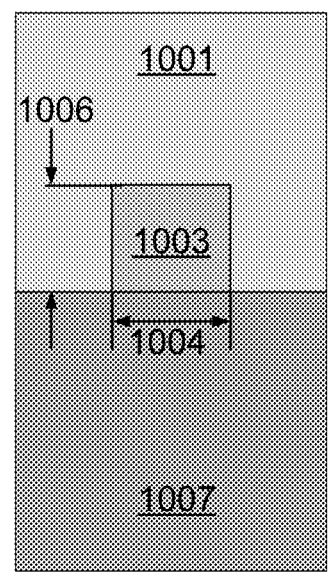
*Fig. 10C*  *Fig. 10D*

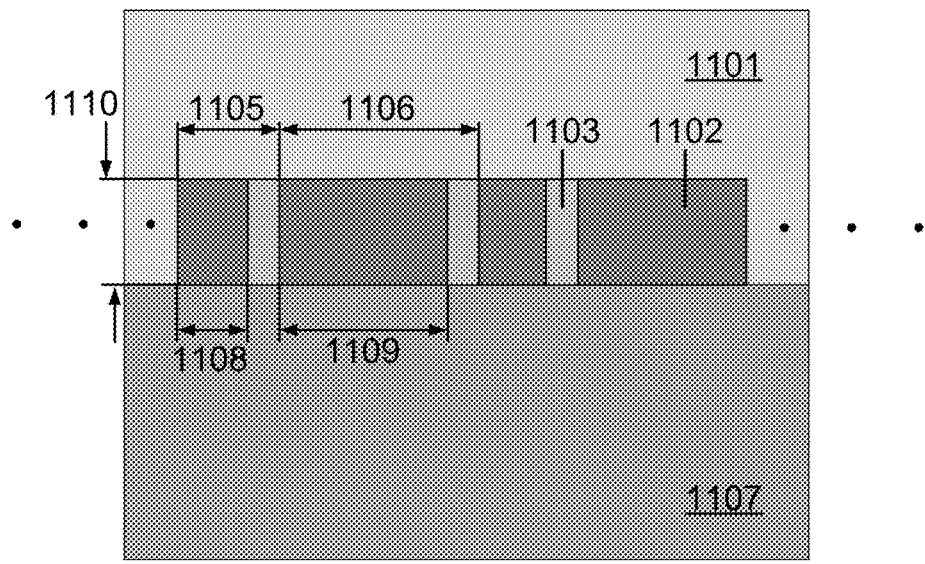
Fig. 11B
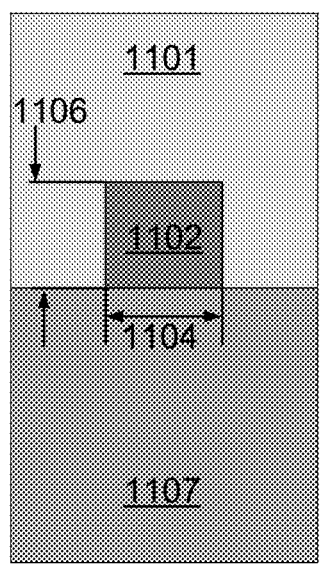 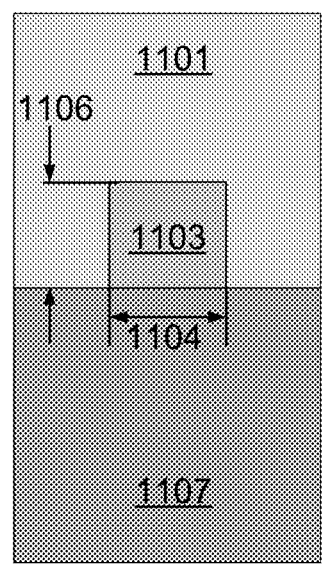
Fig. 11C   Fig. 11D

SUBWAVELENGTH PHOTONIC CRYSTAL WAVEGUIDE IN OPTICAL SYSTEMS

CROSS REFERENCE TO RELATED APPLICATIONS

The application is a continuation-in-part application of U.S. patent application Ser. No. 14/951,464, titled "Subwavelength Photonic Crystal Waveguide with Trapezoidal Shaped Dielectric Pillars in Optical Systems", filed Nov. 24, 2015, the contents of which is all hereby incorporated by reference.

STATEMENT REGARDING FEDERALLY SPONSORED RESEARCH

This invention was made with Government support under grant DE-SC0013178 awarded by the Department of Energy (DOE). The Government has certain rights in this invention.

BACKGROUND

Field of the Invention

The present disclosure relates generally to the field of optical and medical devices, and more specifically to an apparatus and method for optical communication, biological sensing, and chemical sensing.

Background of the Invention

The statements in this section merely provide background information related to the present disclosure and may not constitute prior art.

Integrated photonics has been attracting substantial interest in the past 50 years. Conventional photonic devices are bulky, heavy, expensive, and susceptible to environmental fluctuations, and it is widely accepted that integrated photonics is a promising alternative. However, the search for a suitable integration platform turns out to be a long-lasting effort. A number of material platforms have been explored, such as ion-exchanged glass, Indium Phosphide (InP), silicon-on-insulator (SOI), and polymer, but none of them is perfect. For example, silicon photonics can potentially produce low cost photonic chips with the readily-available CMOS manufacture technology. However, the fact that silicon does not have either a direct band gap or a second-order nonlinearity makes it a great challenge to generate or control photons. Additionally, the large refractive index contrast weakens the photon-matter interaction and makes silicon a less attractive sensing platform. These issues can potentially be solved through hybrid integration of multiple materials and leveraging their advantages.

Subwavelength photonic crystal waveguides, comprised of periodically arranged high index and low index materials with a pitch of less than one wavelength, offer a promising alternative and therefore have received considerable attention in recent years. Bloch modes may be supported by this periodic arrangement of silicon pillars and cladding material, and therefore photons may propagate in theory without being attenuated by the discontinuity of the mediums. Subwavelength photonic crystal waveguides provide another dimension of freedom to precisely control a few important waveguide properties such as refractive index, dispersion, and mode overlap volume, which are determined by the materials comprising the waveguides as demonstrated previously. The control of these properties enables significant improvements over conventional waveguide based devices such as grating couplers, directional couplers, sensors, filters, and modulators.

However, so far the research on subwavelength photonic crystal waveguide is limited to two materials, and the shape of these materials are usually circular or rectangular. These unnecessary constraints greatly limit the applications of subwavelength photonic crystal waveguides. For example, one critical problem remaining unresolved is the large loss of the subwavelength photonic crystal waveguide bends. For instance, a 10 μm radius 90° bend has an insertion loss of ~1.5 dB. To avoid the substantial loss introduced by a subwavelength photonic crystal waveguide bend, the subwavelength photonic crystal waveguide is tapered to conventional strip waveguides before reaching a bend and further tapered back to subwavelength photonic crystal waveguides afterwards. Although the strip waveguide bends can significantly reduce the loss, the taper adds additional loss and wastes the precious silicon chip surface. Therefore, to achieve the goal of building integrated photonic systems with entirely subwavelength photonic crystal waveguides, a low loss and small bend radius subwavelength photonic crystal waveguide bend is highly desirable. In addition, the low loss bend is an essential component for high quality factor subwavelength photonic crystal waveguide ring resonators, which can be used for optical modulators, switches, filters, and sensors. Therefore, extending the concept of subwavelength photonic crystal waveguide to include more types of materials and shapes could further expand the potential of subwavelength photonic crystal waveguides and improve the performance of the devices built on these waveguides.

SUMMARY

A composite artificial optical waveguide is disclosed herein, that is unique in that it provides an additional dimension of freedom to engineer the macroscopic optical properties through tuning the micro- or nano-structures of the materials comprising the composite waveguide. As a result, the overall optical properties can benefit from the advantages of individual materials. These macroscopic optical properties include but are not limited to equivalent refractive index, dispersion, group velocity, optical loss/gain, temperature sensitivity, mode volume overlap factor, and nonlinear optical properties.

The micro- or nano-structures can be a mix of two or more materials arranged periodically or randomly in one, two, or three-dimensional space. The micro- or nano-structures can be in any shape, such as a cylinder, a cuboid, a tetrahedron, and a pyramid. The materials can be in the solid, liquid, and/or gas phase.

The disclosed artificial material can be used for various photonics applications, such as optical waveguide, which can be essential building blocks for passive and active photonic devices such as modulators and ring resonators. The disclosed artificial material can also be used in other scenarios where natural materials have intrinsic limitations, such as grating couplers on high index contrast platforms, wideband silicon photonics devices, and antireflection structures.

In one embodiment, a trapezoidal shaped dielectric pillar based subwavelength photonic crystal waveguide bend is disclosed herein, that is unique in that it provides the freedom to control the refractive index profile across the cross-section of a waveguide and therefore reduce the bend loss of a subwavelength photonic crystal waveguide. Compared to a straight waveguide, waveguide bends usually have additional loss due to the mode delocalization. The delocalized mode causes the mode mismatch between the straight and bend waveguide and hence excessive radiation loss. The mode delocalization is not prominent when the refractive index contrast between the waveguide core and cladding (e.g. silicon) is large and the bend radius is large. As an example, the insertion loss of a silicon strip waveguide bend can be ignored when its radius is larger than 1 µm. The equivalent refractive index of the subwavelength photonic crystal waveguide is relatively small so that the bending loss cannot be ignored. With the trapezoidal shaped dielectric pillars, the equivalent refractive index along the radial direction may be controlled to shift the mode back to the center of the subwavelength photonic crystal waveguide.

With the trapezoidal shaped subwavelength photonic crystal waveguide bend, the quality factor of the subwavelength ring resonator may be significantly improved. A typical optical system employing the high quality factor ring resonator may comprise: a substrate with a bottom cladding to support the structure, a light source, couplers to interface the light source and the optical circuits, tapers to convert the light from a conventional waveguide into a subwavelength photonic crystal waveguide, a ring resonator formed by a periodic arrangement of trapezoidal shaped dielectric pillars, and a subwavelength photonic crystal bus waveguide.

The system may comprise a second-order nonlinear material or a third-order nonlinear material as the top cladding. The complex amplitude of light passing through the system may be changed when the properties of the nonlinear material is changed by electric field, magnetic field, electromagnetic field, optical field, and/or mechanical pressure. The system may comprise electrodes or antennas to improve the performance, and accordingly the system may be an optical modulator, all-optical switch, electro-magnetic sensor, or mechanical sensor.

The thermo-optical coefficients of the cladding and the core materials of the dielectric pillars may have opposite signs. The system may be temperature-independent when the size of the pillars is optimized so that the equivalent thermo-coefficient of the composite material is zero. This feature can be used in passive devices such as optical filters.

The system may also be used with cladding materials in liquid and gas phase such as air and solvents. The complex amplitude of light passing through the system is changed when the analytes in air and solvents interact with the optical field of the guided mode. The presence and quantities of the analytes may be determined by interpreting the change of the complex amplitude of light. Accordingly, the system may be used as a chemical sensor and biosensor.

In addition to ring resonators, the subwavelength photonic crystal waveguide can also be used as a basic building block for other optical structures, such as Fabry-Perot cavities and Mach-Zehnder interferometers. These optical structures can also be used for the aforementioned applications.

In one respect, disclosed is an optical system comprising: a substrate; and a subwavelength photonic crystal waveguide atop the substrate, wherein the subwavelength photonic crystal waveguide comprises a periodic one-dimensional array of two or more interleaved dielectric pillars; wherein the periodicity of the one-dimensional array of two or more interleaved dielectric pillars is constant, a combination of two or more periods, or random; wherein the one-dimensional array of two or more interleaved dielectric pillars is substantially linear or curved; wherein each of the pillars of the one-dimensional array of two or more interleaved dielectric pillars is at least one of a triangular prism, a trapezoidal prism, an elliptic cylinder, a cylinder, a tube, a frustum, a pyramid, a trapezoidal prism, and an asymmetric frustum; and wherein each of the pillars of the one-dimensional array of two or more interleaved dielectric pillars comprises a solid, liquid, and/or gas.

In one respect, disclosed is an optical system comprising: a substrate; and a subwavelength photonic crystal waveguide atop the substrate, wherein the subwavelength photonic crystal waveguide comprises a periodic two-dimensional array of two or more interleaved dielectric pillars; wherein the periodicity of the two-dimensional array of two or more interleaved dielectric pillars is constant, a combination of two or more periods, or random; wherein the two-dimensional array of two or more interleaved dielectric pillars is substantially linear or curved; wherein each of the pillars of the two-dimensional array of two or more interleaved dielectric pillars is at least one of a triangular prism, a trapezoidal prism, an elliptic cylinder, a cylinder, a tube, a frustum, a pyramid, a trapezoidal prism, and an asymmetric frustum; and wherein each of the pillars of the two-dimensional array of two or more interleaved dielectric pillars comprises a solid, liquid, and/or gas.

Numerous additional embodiments are also possible.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure. Other objectives and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include exemplary embodiments of the present invention, which may be embodied in various forms. The drawings described herein are for illustrative purposes only of selected embodiments and not of all possible implementations, and are not intended to limit the scope of the present disclosure in any way. It is to be understood that in some instances, various aspects of the present invention may be shown exaggerated or enlarged to facilitate an understanding of the invention.

A more complete and thorough understanding of the present invention and benefits thereof may be acquired by referring to the following description together with the accompanying drawings, in which like reference numbers indicate like features, and wherein:

FIG. 2B is an SEM image of a conventional rectangular waveguide bend, while

FIGS. 8B-8D are the cross-sections taken along the dashed lines S-S', T-T', and U-U', respectively, of FIG. 8A.

FIGS. 9B-9D are the cross-sections taken along the dashed lines V-V', W-W', and X-X', respectively, of FIG. 9A.

FIGS. 10B-10D are the cross-sections taken along the dashed lines Y-Y', Z-Z', and AA-AA', respectively of FIG. 10A.

FIGS. 11B-11D are the cross-sections taken along the dashed lines BB-BB', CC-CC', and DD-DD', respectively, of FIG. 11A.

FIGS. 15A-15K each show the top view as well as the two side views of a triangular prism, a trapezoidal prism, an elliptic cylinder, a cylinder, an arbitrary shaped cylinder, an arbitrary shaped cylinder with voids, a tube, a frustum, a pyramid, a trapezoidal prism, and an asymmetric frustum, respectively, in accordance with some embodiments.

DETAILED DESCRIPTION

Detailed Description of the Invention

Detailed descriptions of the preferred embodiments are provided herein. It is to be understood, however, that the present invention may be embodied in various forms. The specific details disclosed herein are not to be interpreted as limiting, but rather as a basis for the claims and as representative basis for teaching one skilled in the art to employ the present invention in virtually any appropriately detailed system, structure, or manner. In all the accompanying drawings, same numerals are used within each figure to represent the same or similar materials, and redundant descriptions are omitted.

The invention discloses methods of reducing the loss of subwavelength photonic crystal waveguide bends and high quality factor subwavelength ring resonator based filters, modulators, and sensors. The low loss subwavelength photonic crystal waveguide bends are achieved by optimizing the shape of the dielectric pillars comprising the subwavelength photonic crystal waveguide to minimize the phase front distortion inside the bends. The disclosed trapezoidal shaped pillars may significantly reduce the bend loss. Subwavelength ring resonators based on the trapezoidal shaped pillars show a significantly improved quality factor and may be used to build devices such as a subwavelength photonic crystal bus waveguide, a subwavelength ring resonator with trapezoidal shaped dielectric pillars, input and output tapers to convert the strip waveguide mode into the subwavelength photonic crystal waveguide mode and vice versa, and couplers to couple light into and out from the chip. Light (from a broadband source or LED) coupled into the subwavelength photonic crystal waveguide couples with the resonance of the ring resonator and thereby drops the resonant wavelength into the resonator, leading to a minimum in the transmission spectrum of the ring resonator at the resonant wavelength. The resonance wavelength shifts in response to the change of ambient refractive index. Proper cladding materials are chosen to satisfy the requirement of different applications.

Figure 1A:
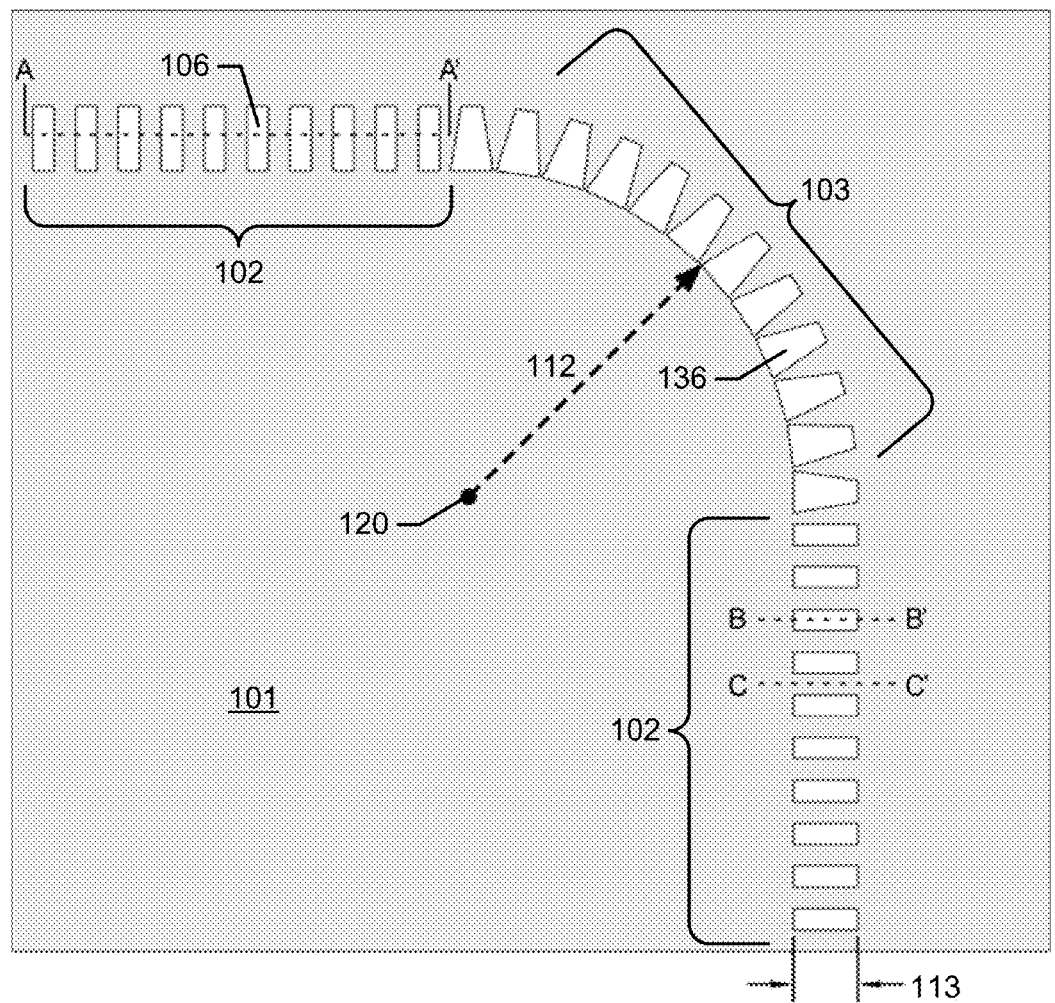
FIG. 1A is a top view schematic drawing of a trapezoidal shaped subwavelength photonic crystal waveguide bend, in accordance with some embodiments.
Figure 1B:
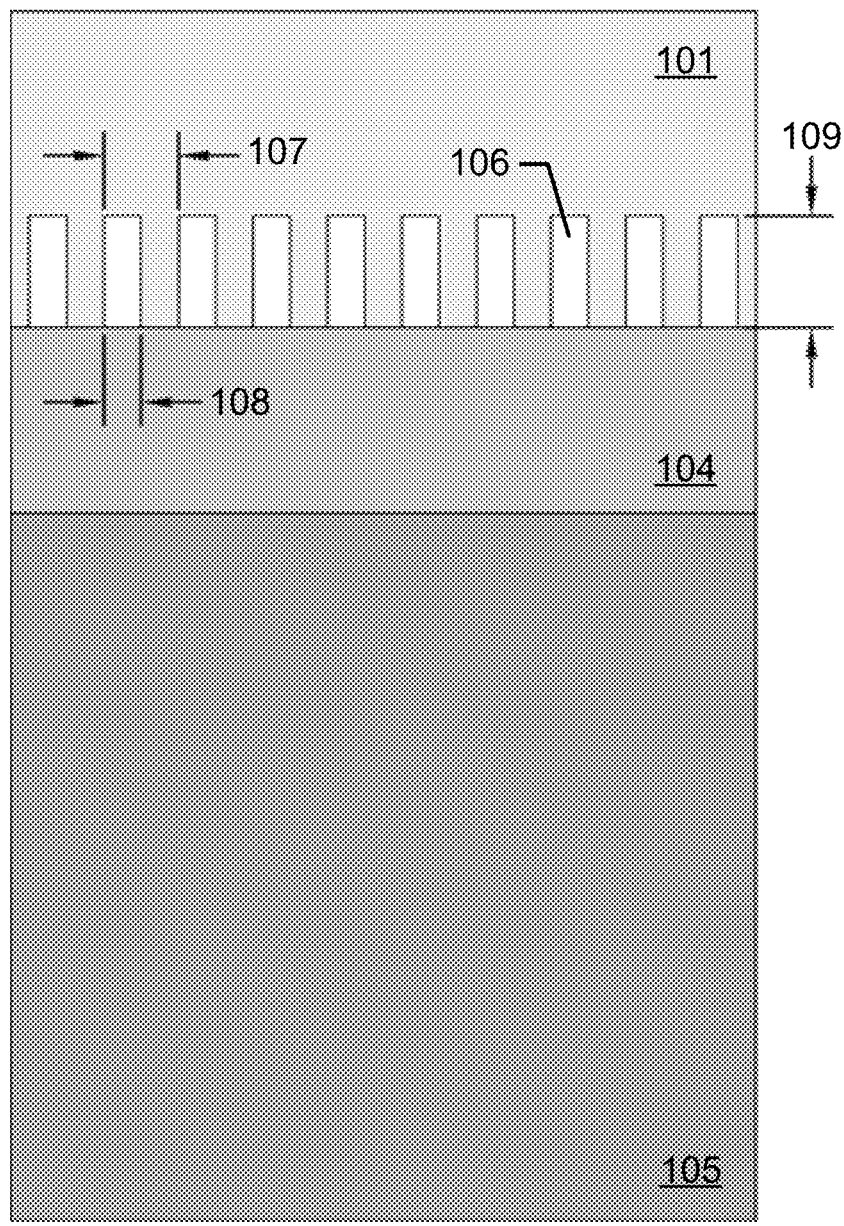
FIG. 1B, FIG. 1C, and FIG. 1D are the cross-sections taken along the dashed lines A-A', B-B', and C-C', respectively, of FIG. 1A.
Figure 1C:
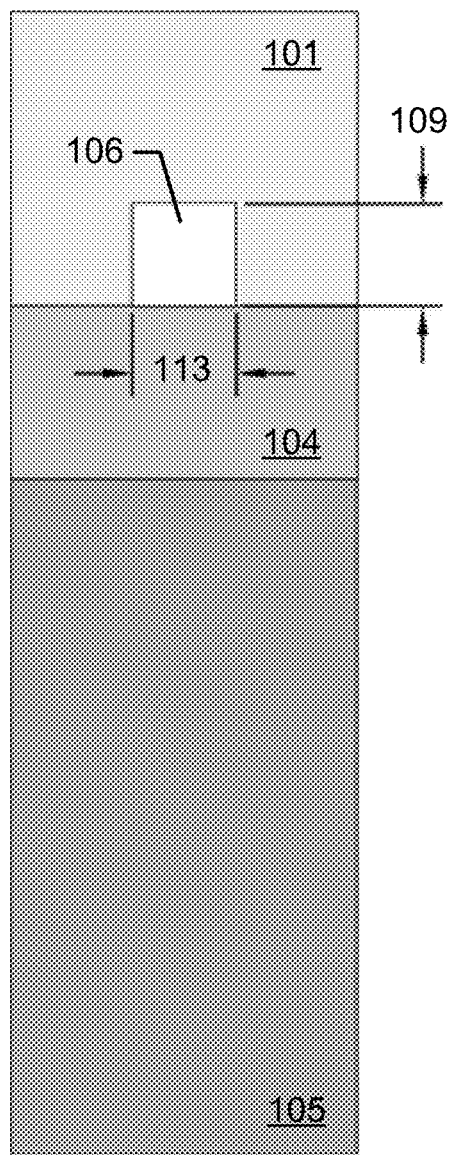
Figure 1D:
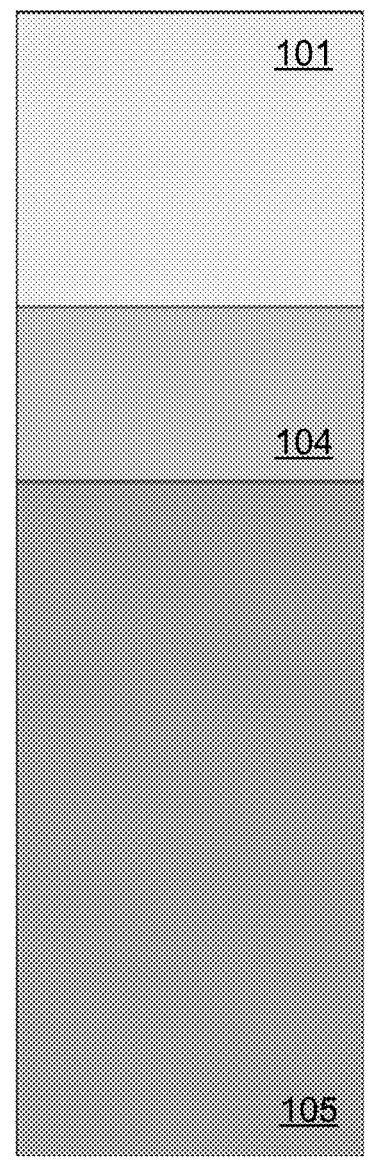
Figure 1E:
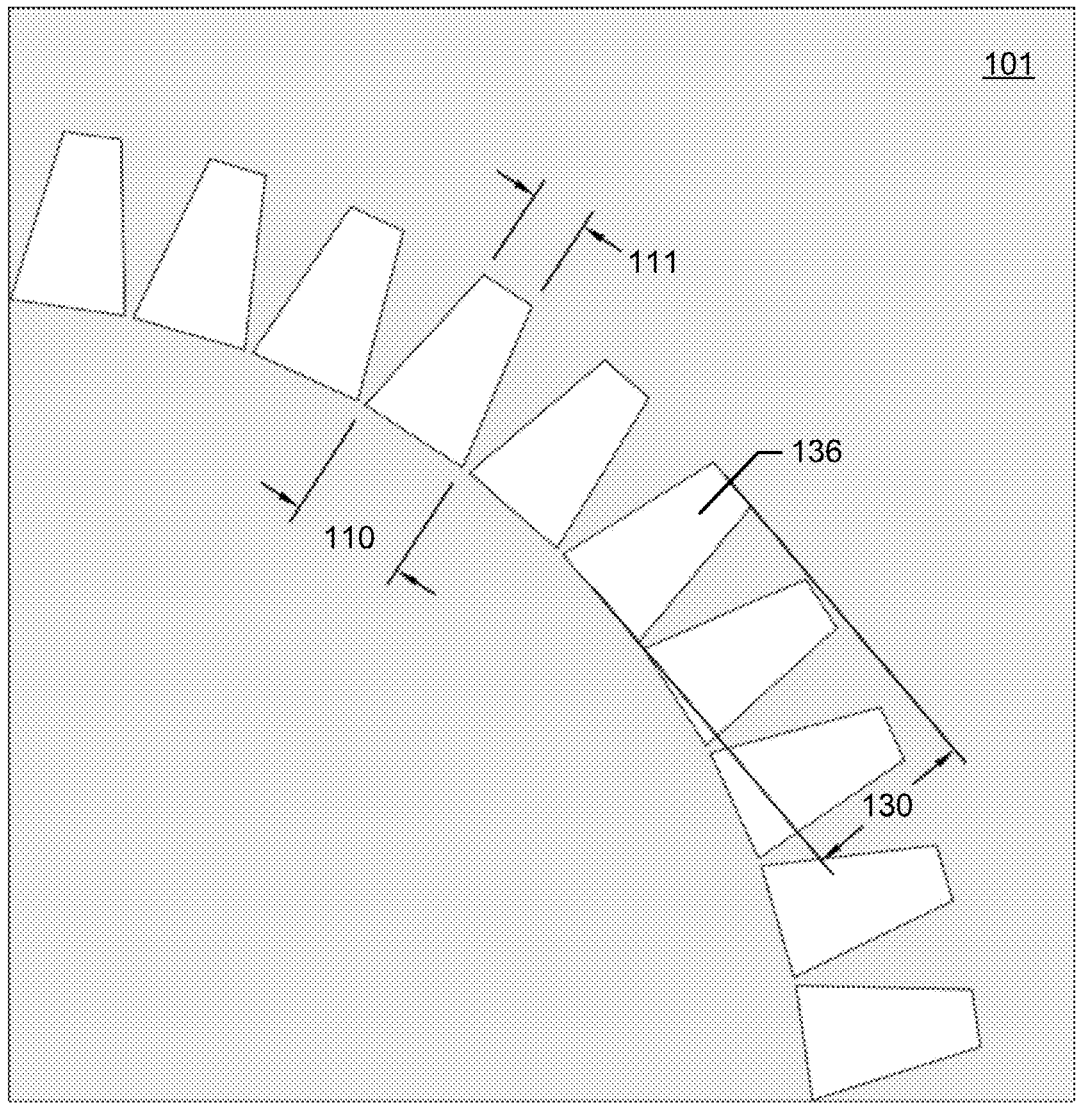
FIG. 1E is a magnified schematic drawing showing a section of the trapezoidal shaped pillar of the waveguide bend in FIG. 1A.

In FIG. 1A, a trapezoidal shaped subwavelength photonic crystal waveguide 103 is used to reduce the bend loss of the subwavelength photonic crystal waveguide 102. FIG. 1B, FIG. 1C, and FIG. 1D are the cross-sections taken along the dashed lines A-A', B-B', and C-C' of FIG. 1A, respectively. FIG. 1E is a magnified schematic drawing showing a section of the trapezoidal shaped pillar of the waveguide bend in FIG. 1A. The subwavelength photonic crystal waveguide is formed by periodically arranging the dielectric pillars 106. The optical properties, including dispersion, group velocity, mode volume overlap, etc., may be controlled by tuning the thickness 109, width 113, period 107, and depth 108 of the dielectric pillars 106. The subwavelength photonic crystal waveguide 102 and trapezoidal shaped subwavelength photonic crystal waveguide 103 are immersed in top cladding material 101 and rest upon bottom cladding 104. The substrate 105 may be a different material or the same material as bottom cladding 104. The propagation loss of a straight subwavelength photonic crystal waveguide is low due to the excitation of Bloch modes. However, the loss of a subwavelength photonic crystal waveguide bend is devastating. For instance, a 10 μm radius 90° bend has an insertion loss of ~1.5 dB. The bend loss may be significantly reduced by tuning the top width 111 and bottom width 110 of the series of trapezoidal shaped dielectric pillars 136 according to the bend radius 112. The bend radius has a center 120 from where the subwavelength photonic crystal waveguide bend is centered wherein the bottom width of the trapezoidal shaped dielectric pillars is closer to the center than the top width of the trapezoidal shaped dielectric pillars. The trapezoidal shaped dielectric pillars 136 have a trapezoid height 130 that is roughly equivalent to the width 113 of the subwavelength photonic crystal waveguide regions 102 that do not have a bend.

Figure 2A:
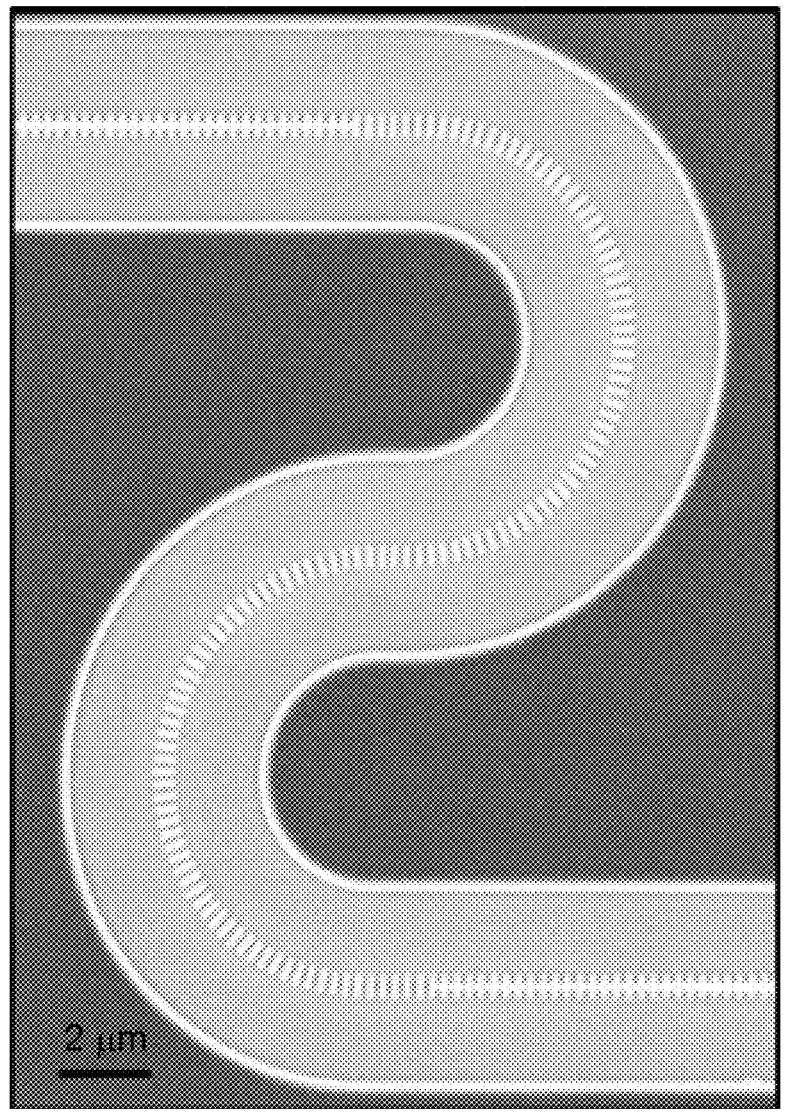
FIG. 2A is a scanning electron microscopy (SEM) image of a subwavelength photonic crystal waveguide bend comprising four 90° bends, in accordance with some embodiments.
Figure 2B:
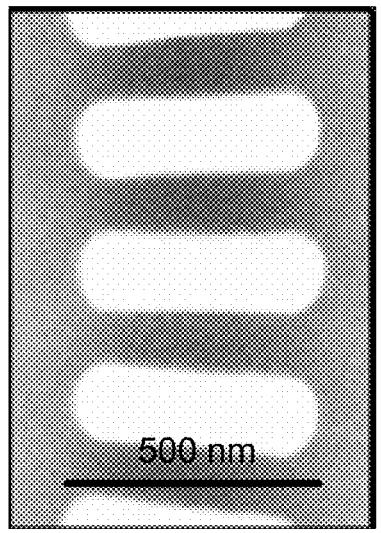
Figure 2C:
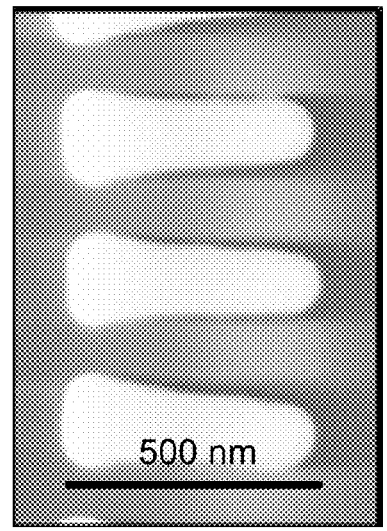
FIGS. 2C-2E are the trapezoidal shaped waveguide bends with different top and base width.
Figure 2D:
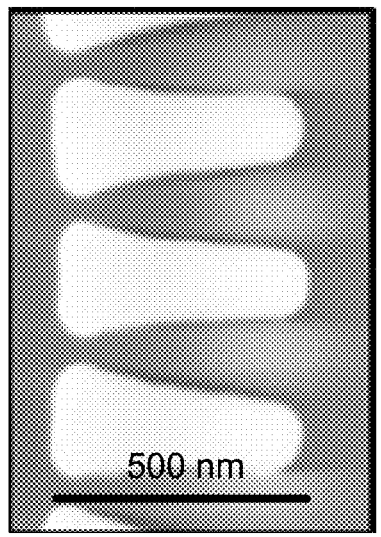
Figure 2E:
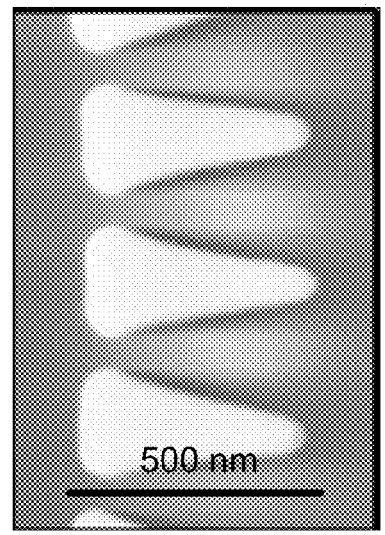
Figure 2F:
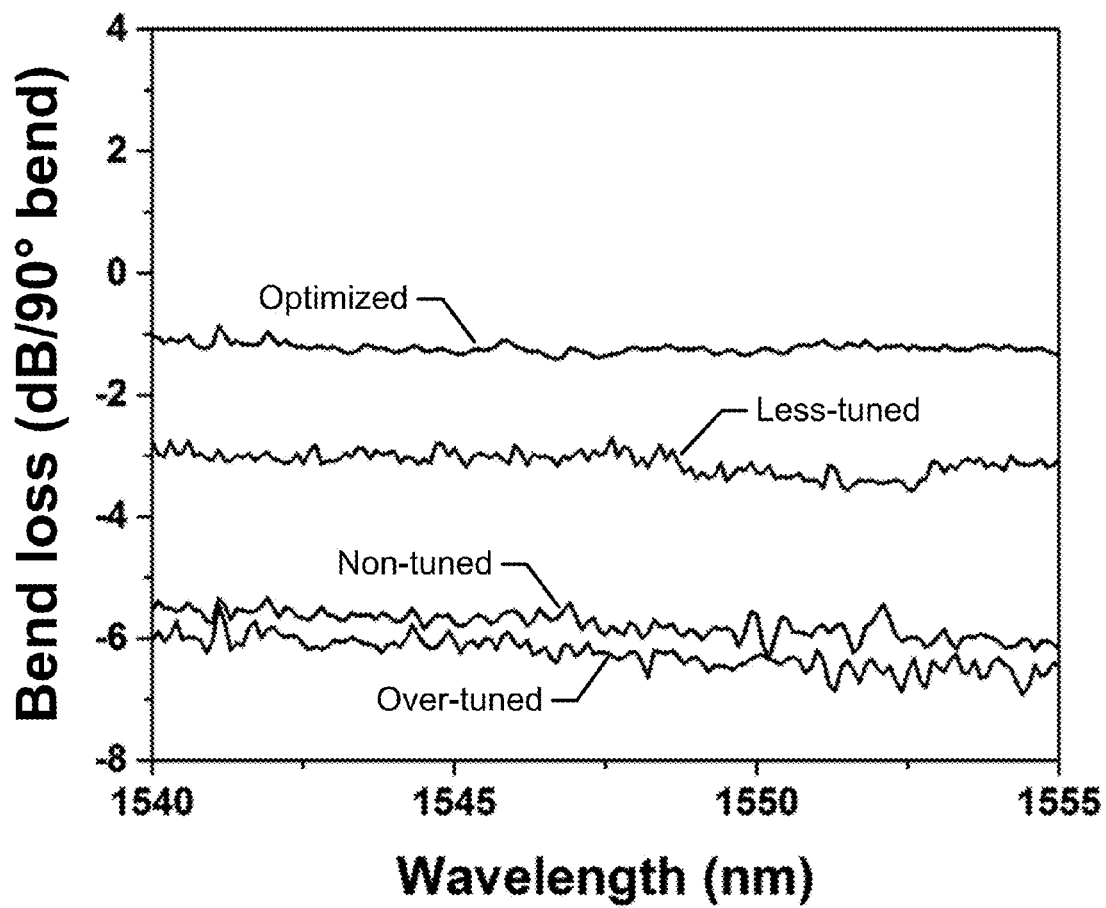
FIG. 2F shows the transmission spectra of the subwavelength photonic crystal waveguide bends.
Figure 2G:
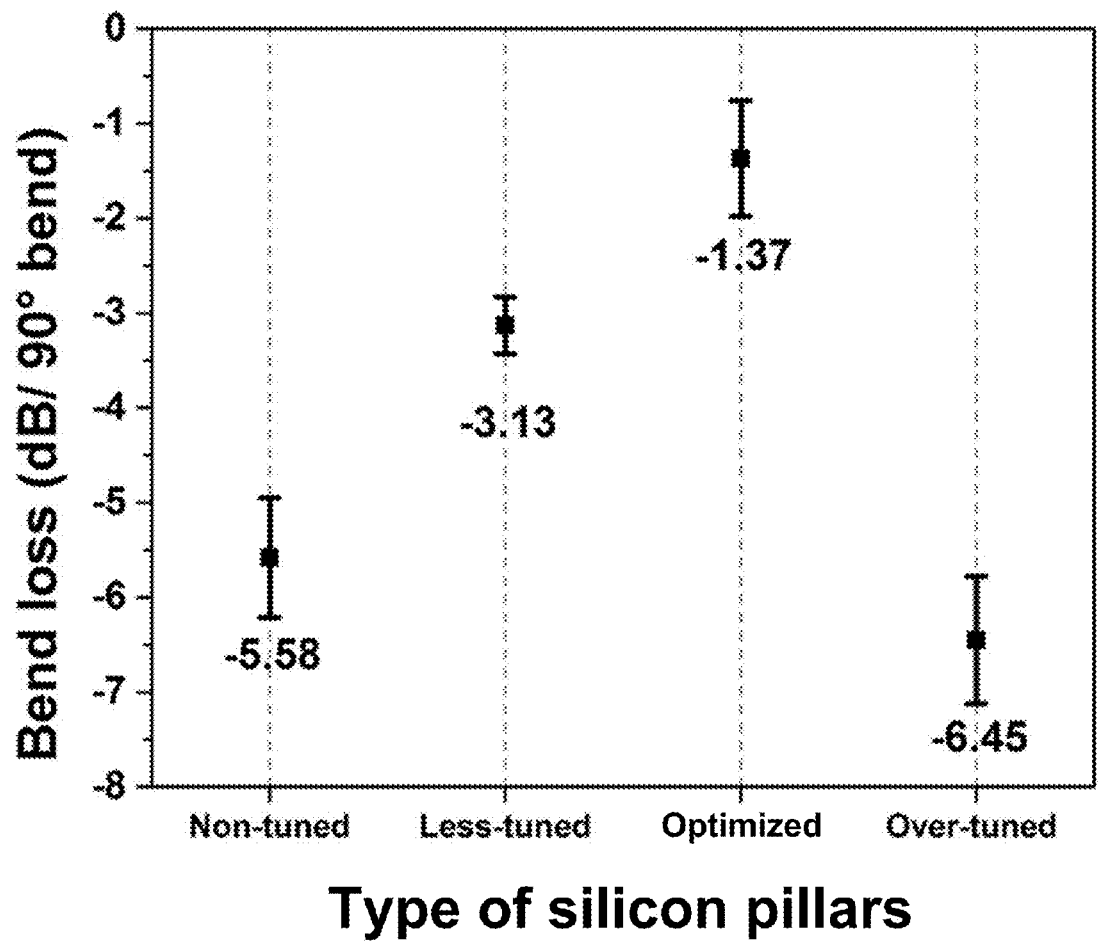
FIG. 2G is the bend loss of the four different bends, showing that trapezoidal shaped waveguide bends may reduce the bend loss from −6.45 dB to −1.37 dB.

FIG. 2A is a scanning electron microscopy (SEM) image of a subwavelength photonic crystal waveguide bend comprising four 90° trapezoidal shaped dielectric pillar bends on a silicon-on-insulator platform, in accordance with some embodiments. To test the bending losses, four waveguide bend structure devices were manufactured as illustrated for one of the pillar designs in FIG. 2A. A waveguide bend structure device was made for each of the four types of silicon pillars: a non-tuned rectangular pillar (150 nm top base and 150 nm bottom base) pictured in FIG. 2B, a less-tuned trapezoidal pillar (120 nm top base and 190 nm bottom base) pictured in FIG. 2C, an over-tuned trapezoidal pillar (70 nm top base and 210 nm bottom base) pictured in FIG. 2E, and an optimally-tuned trapezoidal pillar (140 nm top base and 210 nm bottom base) pictured in FIG. 2D. The devices are made on an SOI (Silicon-On-Insulator) wafer manufactured by Soitec comprising a 250 nm thick top silicon layer (n=3.476) lying on a 3 μm thick buried oxide (BOX, n=1.45) layer. All structures are patterned in a single E-beam lithography step using a JEOL 6000 FSE. The patterns are then transferred into the underneath silicon layer through reactive-ion-etching using a PlasmaTherm 790. The agreement of the morphology of the devices with the design is confirmed by scanning electron microscopy (ZEISS Neon 40) as shown in FIGS. 2B-2E. Each device has four 90° bends. After spin-coating an SU-8 cladding, the devices are tested in a grating coupler alignment system. FIG. 2F shows the transmission spectra of the four subwavelength photonic crystal waveguide bends between 1540 nm and 1555 nm operating at the transverse electric (TE) mode. The insertion loss of the four representative bends at 1550 nm is shown graphically in FIG. 2G, where the optimized trapezoidal silicon pillars is as low as 1.37 dB per 90° bend, only 24.5% of that of the non-tuned rectangular silicon pillars (5.58 dB per 90° bend). When the pillars are over-tuned, the refractive index distortion and mode mismatch increases, and thus the loss increases. The experimental results demonstrate that the loss of subwavelength photonic crystal waveguide bends can be significantly reduced by optimizing the shapes of the silicon pillars.

Figure 3A:
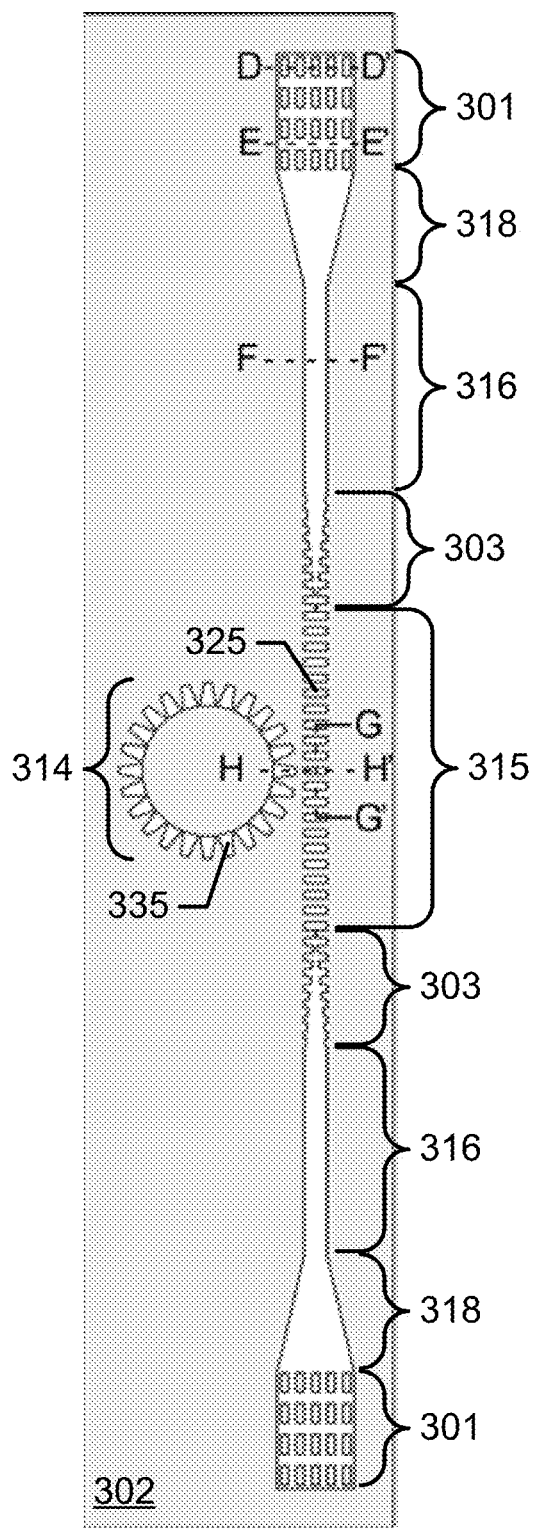
FIG. 3A is a top view schematic drawing of a ring resonator formed by a trapezoidal shaped pillar bend, in accordance with some embodiments.
Figure 3B:
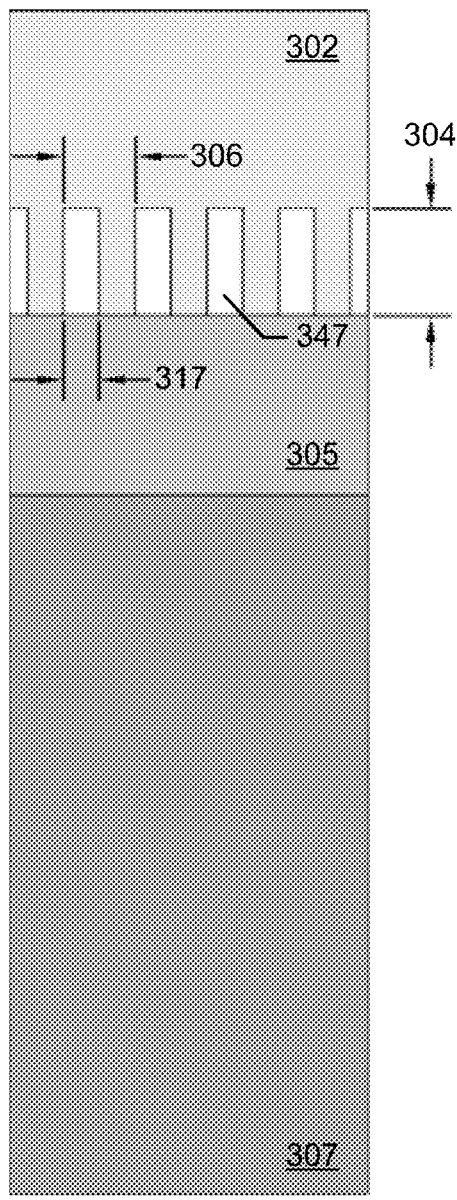
FIGS. 3B-3F are the cross-sections taken along the dashed lines D-D', E-E', F-F', G-G', and H-H', respectively, of FIG. 3A.
Figure 3C:
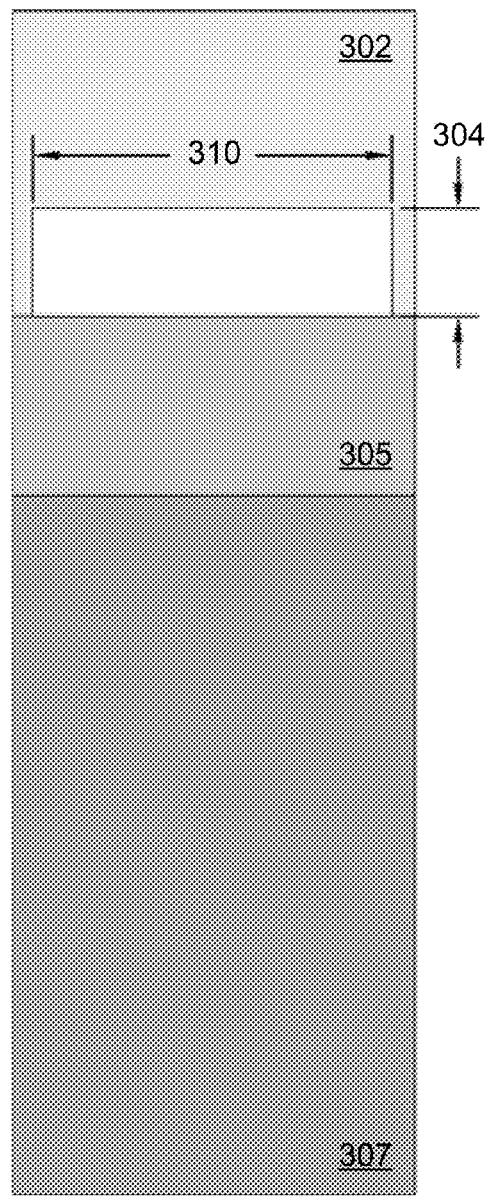
Figure 3D:
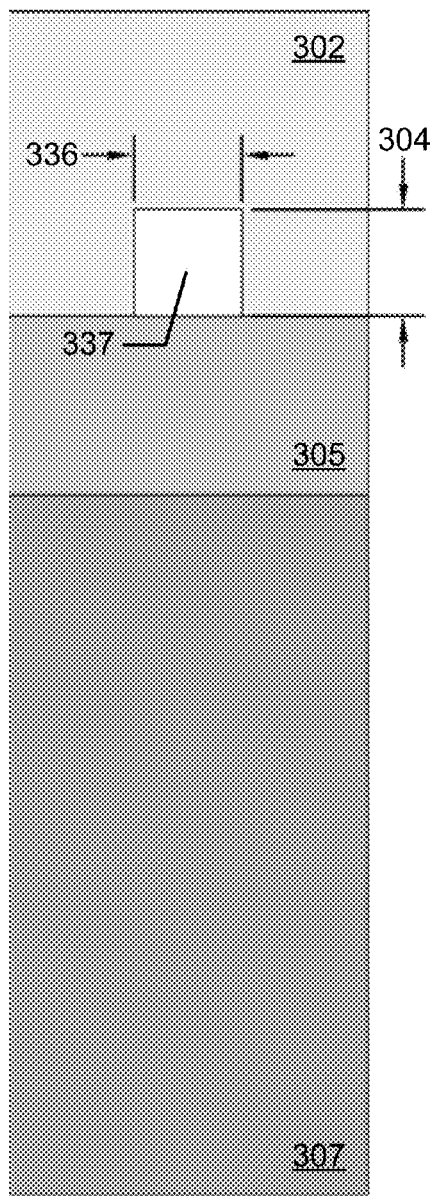
Figure 3E:
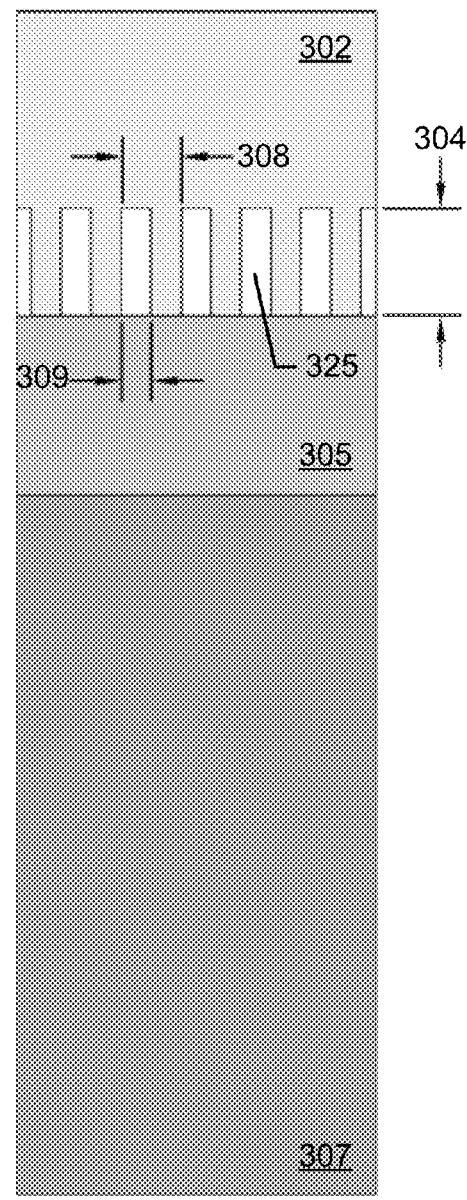
Figure 3F:
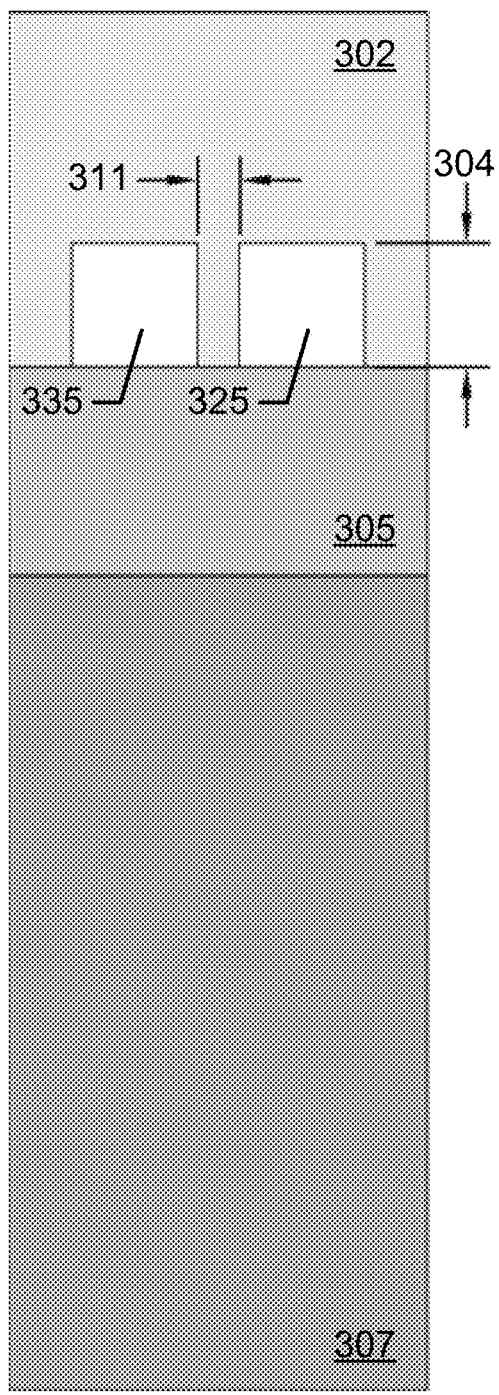
Figure 3G:
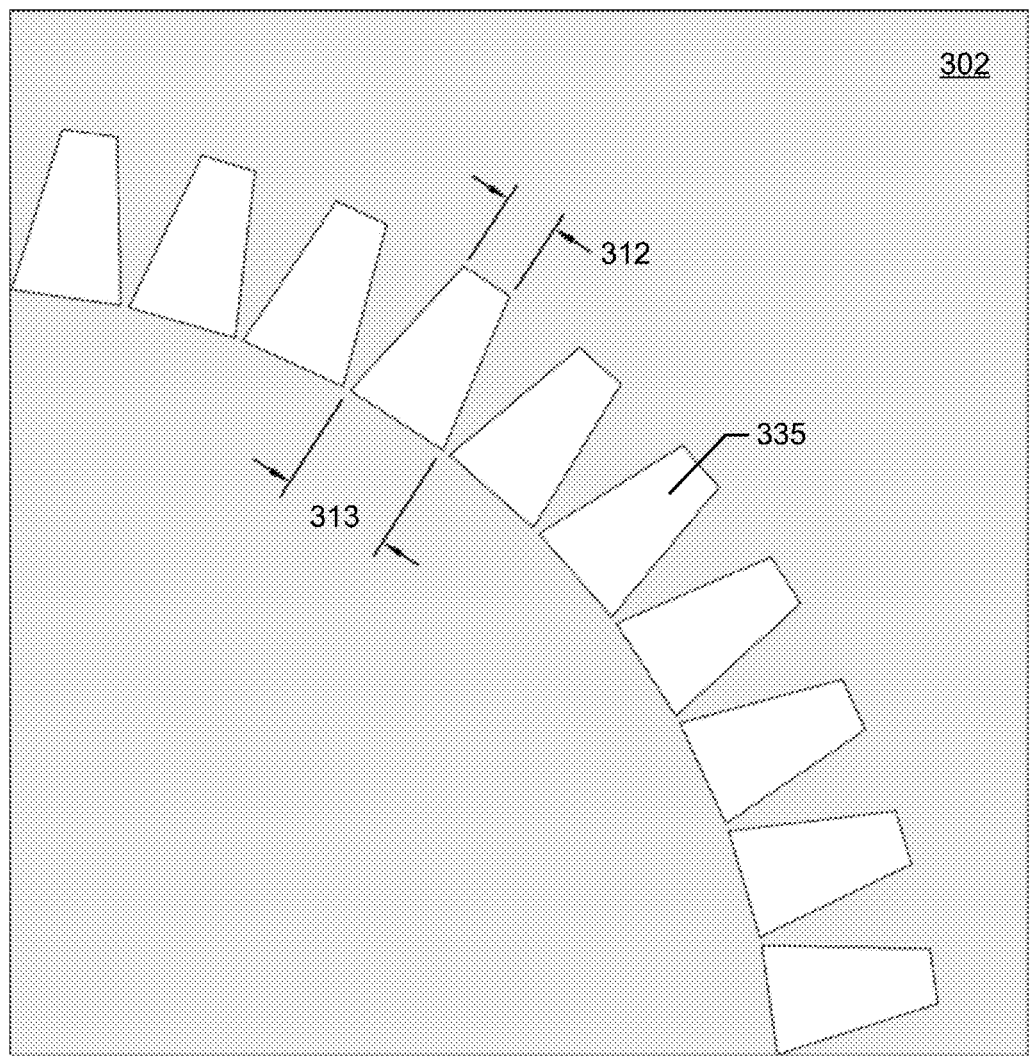
FIG. 3G is a magnified schematic drawing showing a section of the trapezoidal shaped pillar of the ring resonator in FIG. 3A.

FIG. 3A is a top view schematic drawing of a ring resonator all-optical switch based on the trapezoidal shaped subwavelength photonic crystal waveguide, wherein the ring resonator all-optical switch is immersed in top cladding material 302 and rests upon bottom cladding 305. FIGS. 3B, 3C, 3D, 3E, and 3F are the cross-sections taken along the dashed lines D-D', E-E', F-F', G-G', and H-H', respectively, of FIG. 3A and FIG. 3G is a magnified schematic drawing showing a section of the trapezoidal shaped pillars of the ring resonator in FIG. 3A. The ring resonator is formed by a circular ring of trapezoidal shaped high refractive index dielectric pillars 335 of sufficient height 304 sitting on top of the bottom cladding 305, as illustrated in FIGS. 3A, 3F, and 3G. The whole structure is supported by a substrate 307. The ring resonator 314 is side-coupled to a bus waveguide 315 which is a conventional subwavelength photonic crystal waveguide, with dielectric pillars 325 of period 308, depth 309, and height 304, as illustrated in FIG. 3E. The coupling strength between the bus waveguide and the ring resonator is tuned by the gap 311, as illustrated in FIG. 3F. To achieve a high quality factor, the top width 312 and bottom width 313 of the trapezoidal shaped dielectric pillars 335 are tuned to minimize the loss, as illustrated in FIG. 3G. The coupling strength is adjusted accordingly to meet the coupling requirements and achieve a high quality factor. To facilitate a lossless transition between strip waveguide 316 and subwavelength photonic crystal waveguide 315, an inverse taper 303 with fins of increasing length is adopted. The number of periods, the position, and the length of the fins may be tuned to further enhance the transmission at wavelengths of interest. Subwavelength grating couplers 301 are designed to couple light from optical fibers into the on-chip circuit. The coupling efficiency of the grating coupler may be optimized by tuning the subwavelength grating period 306 and filling factor 317 of the dielectric pillars 347 with a height 304, as illustrated in FIG. 3B. The subwavelength grating couplers 301 have a height 304 and width 310, as illustrated in FIG. 3C. An adiabatic taper 318 is used to bridge the grating coupler regions 301 and the strip waveguides 316. The subwavelength grating coupler has a width 310 around 10 μm and the single mode waveguide 337 has a width 336 around 500 nm and a height 304, as illustrated in FIG. 3C and FIG. 3D, respectively. For all-optical switches, materials 302 with large third-order nonlinearity and small third-order absorption are applied through spin-casting, deposition, or transferring. These materials include but are not limited to 2D materials (graphene, graphene oxide, etc.), polymer (DDMBT, etc.), and semiconductor materials (silicon nitride, etc.). A pump is either coupled into the waveguide together with the probe through grating couplers 301 or incidents vertically onto the ring resonator without coupling into the waveguide. The pump may be generated by a modulated continuous—working laser or a pulsed laser. The wavelength of the probe is fixed at one resonance frequency of the ring resonator. When the pump is off, the output of the probe reaches the minimum and the switch is turned off. When the pump is on, the refractive index change of the cladding material shifts the resonance of the resonator. As a result, the output of the probe light increases and the switch is turned on.

The same structure illustrated in FIGS. 3A-3G may also be used for athermal devices when the thermo-optic coefficients of the cladding 302 and the subwavelength dielectric pillars 325, 335 have opposite signs. The equivalent thermo-coefficient of the structure equals zero when the period 308 and the depth 309 of the dielectric pillars 325 and the top width 312 and bottom width 313 of the trapezoidal shaped dielectric pillars 335 are designed properly.

Figure 4A:
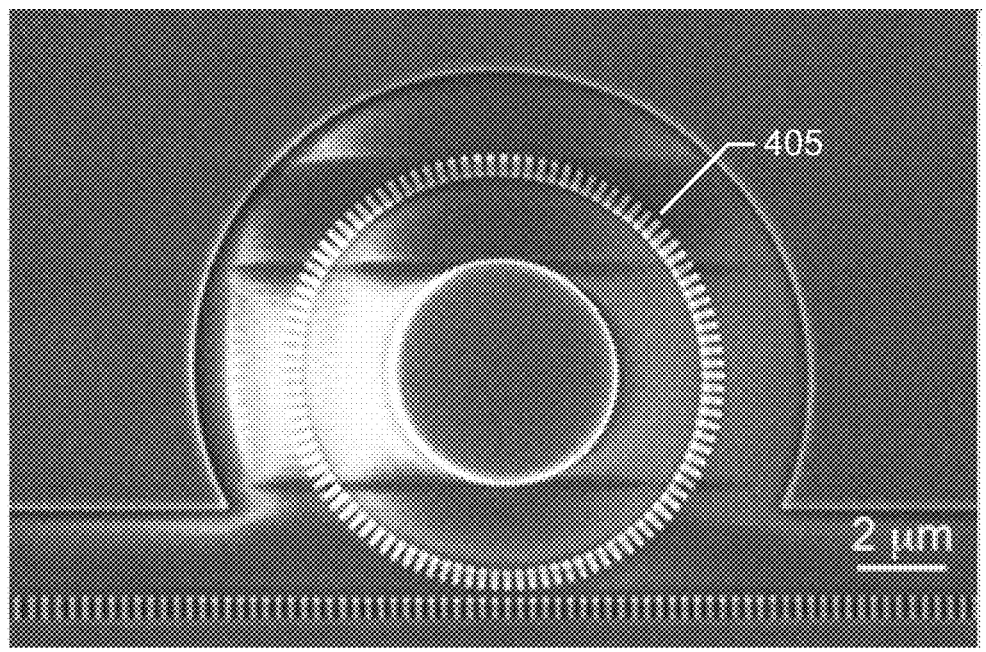
FIG. 4A is an SEM picture of a trapezoidal ring resonator, in accordance with some embodiments.
Figure 4B:
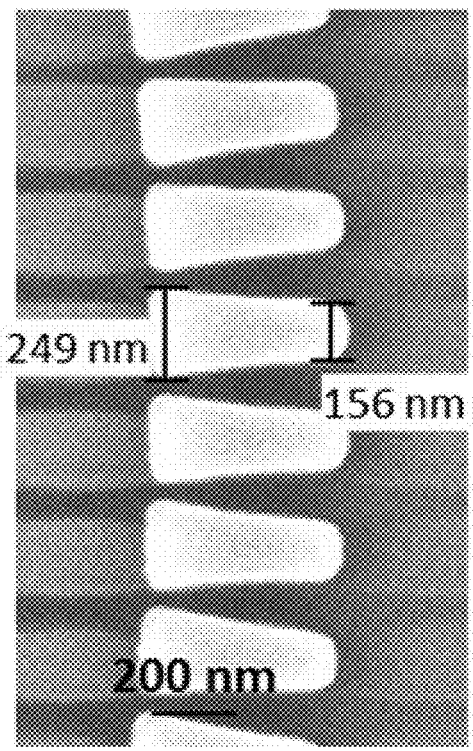
FIG. 4B is a zoomed in picture showing the fabricated trapezoidal structures of FIG. 4A.
Figure 4C:
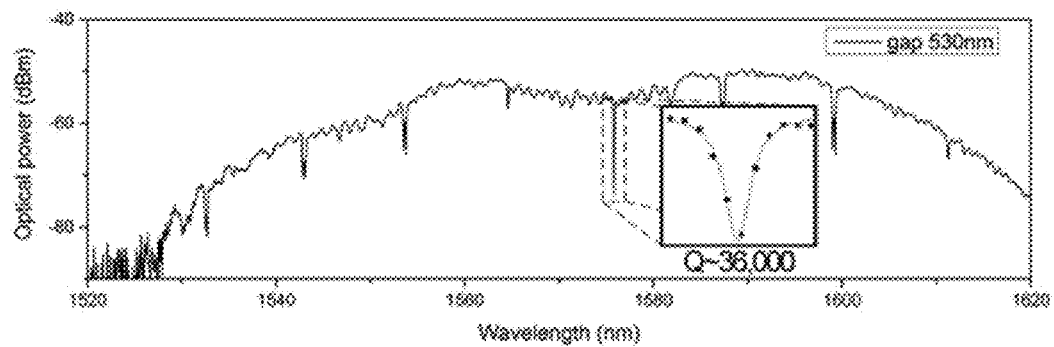
FIG. 4C and FIG. 4D are the transmission spectra of ring resonators with gap sizes of 530 nm and 570 nm, respectively.
Figure 4D:
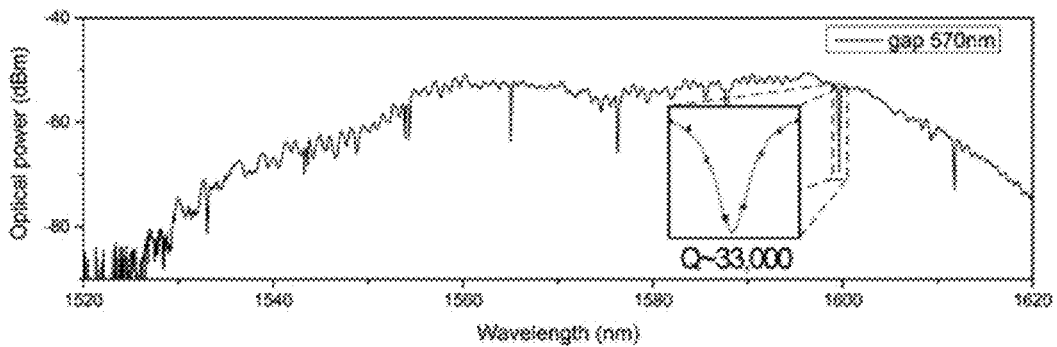
Figure 4E:
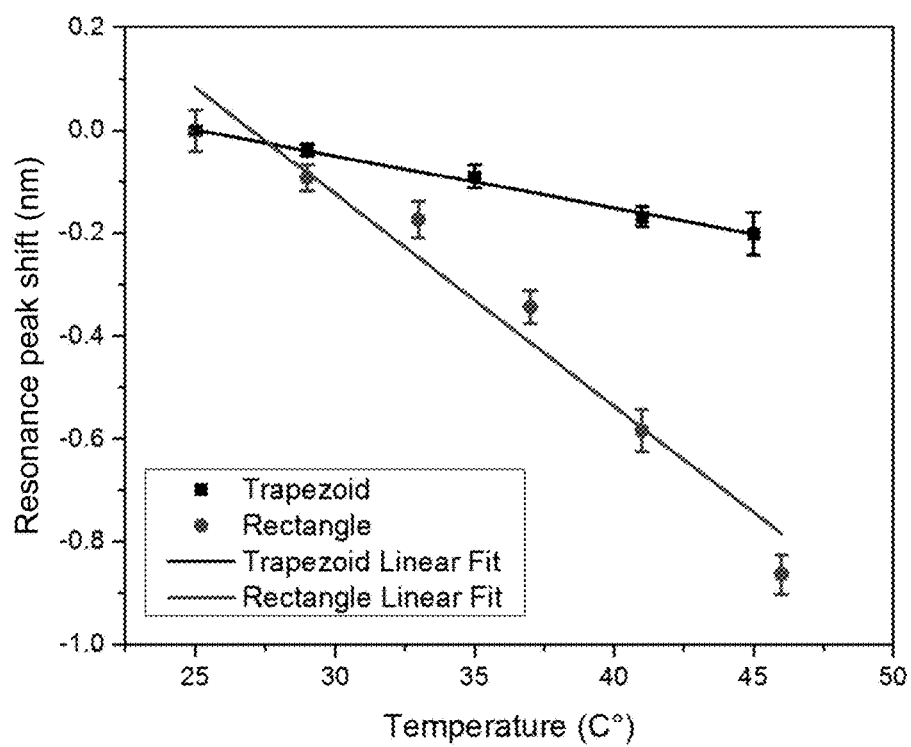
FIG. 4E shows that with SU 8 cladding, the temperature sensitivity of the resonance may be reduced to 10 pm/° C.

FIG. 4A is an SEM image of a fabricated subwavelength ring resonator 405 with a 10 µm bending radius. FIG. 4B is a magnified SEM image showing the shape of the trapezoidal shaped dielectric pillars. The top width of the trapezoidal shaped dielectric pillars of the subwavelength ring resonator is 156 nm and the bottom width is 249 nm. FIG. 4C and FIG. 4D are the transmission spectra of the trapezoidal ring resonators with gap sizes of 530 nm and 570 nm, respectively. The transmission spectra are obtained by coupling a broadband light source into the device through the coupler on one end, and analyzing the light coupled out from the other end with an optical spectrum analyzer. The quality factor of the subwavelength ring resonator may be tuned by the gap size between the bus waveguide and the ring resonator. The quality factor is defined as the ratio of the energy stored in the oscillating resonator to the energy dissipation rate and can be calculated by taking the ratio of the resonance wavelength, $\lambda_{res}$, to the full width at half maximum, $\Delta\lambda$. When the gap size is 530 nm, the quality factor is about 36,000, as shown and magnified in the inset box in FIG. 4C and when the gap size increases to 570 nm, the quality factor reduces to about 33,000 as shown and magnified in the inset box in FIG. 4D. FIG. 4E shows that combining two materials of positive and negative thermo-optic coefficients can cancel the temperature dependence of the ring resonator device. The results show that the temperature sensitivity may be reduced to −10 pm/° C., thus making temperature independent devices possible with the optimization of the size of the trapezoidal shaped dielectric pillars.

Figure 5A:
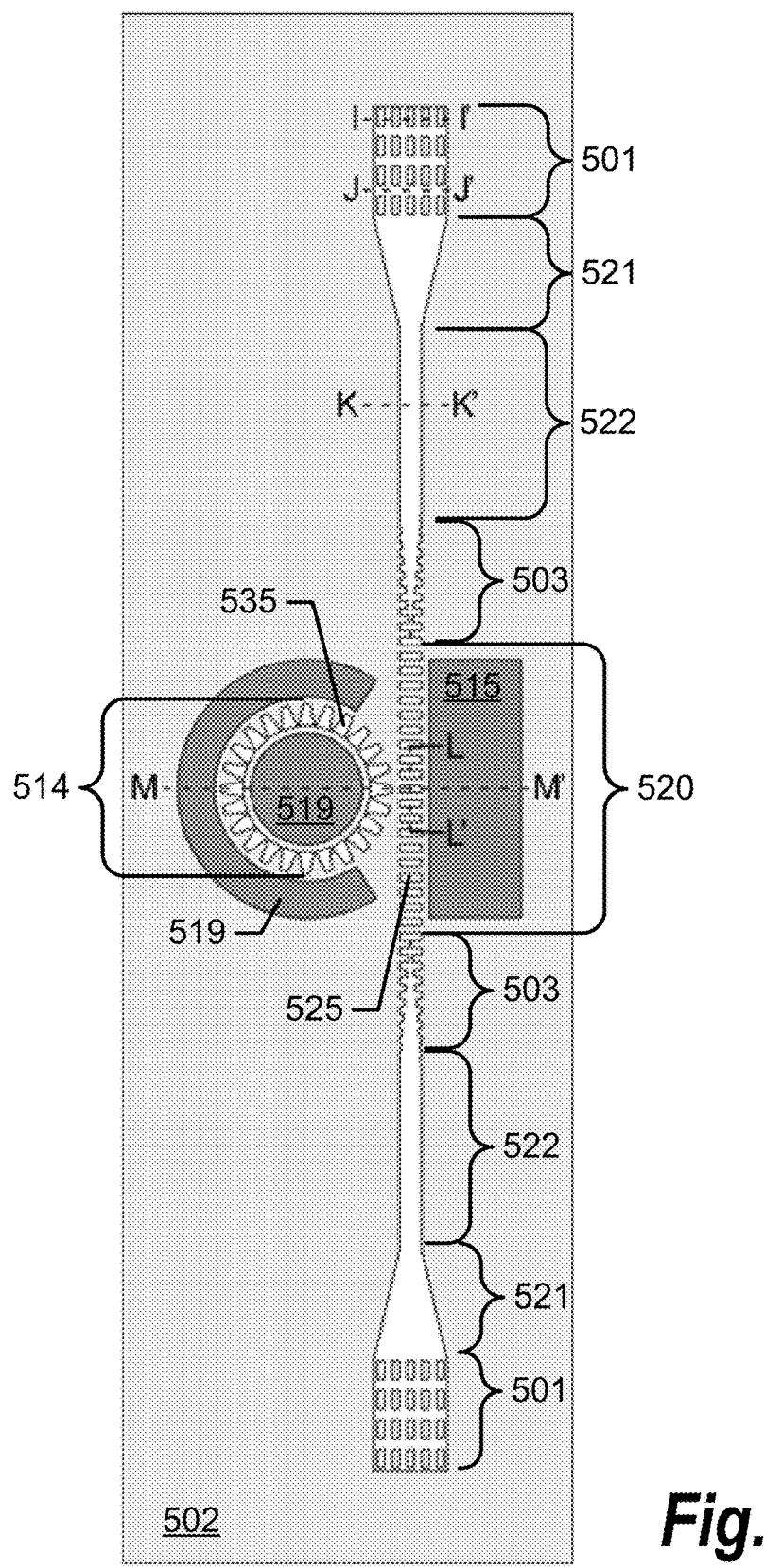
FIG. 5A is a top view schematic drawing of a modulator, in accordance with some embodiments.
Figure 5B:
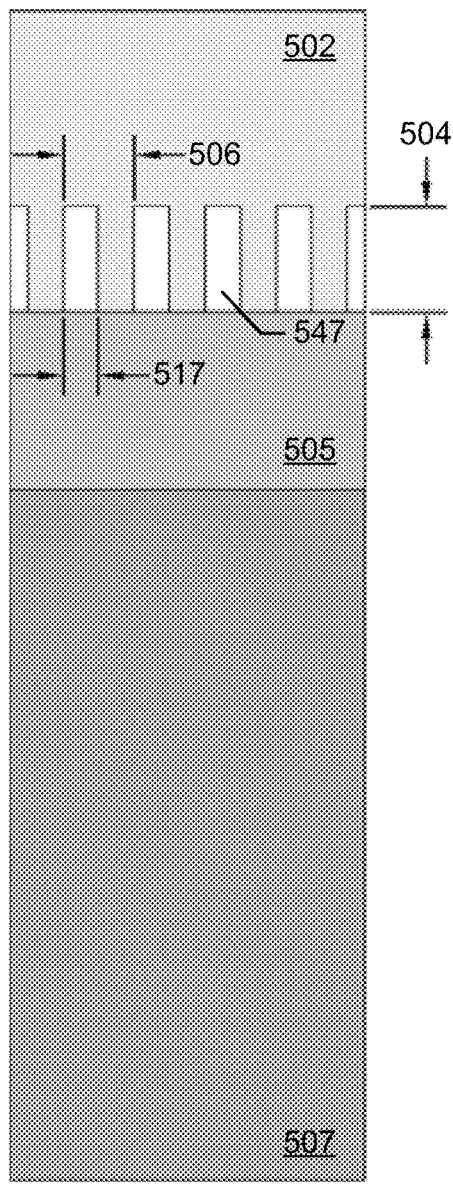
FIGS. 5B-5F are the cross-sections taken along the dashed lines I-I', K-K', L-L', and M-M', respectively, of FIG. 5A.
Figure 5C:
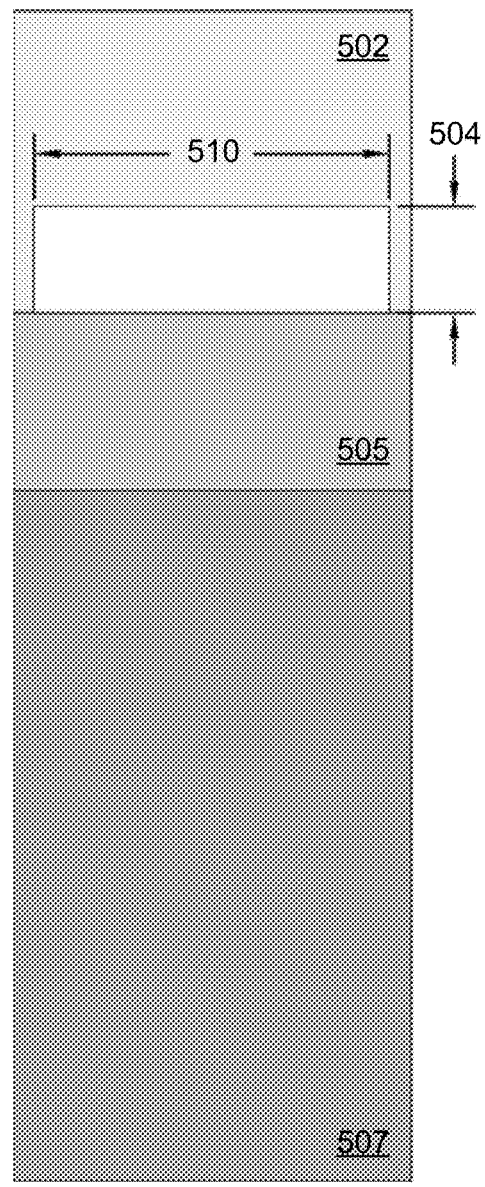
Figure 5D:
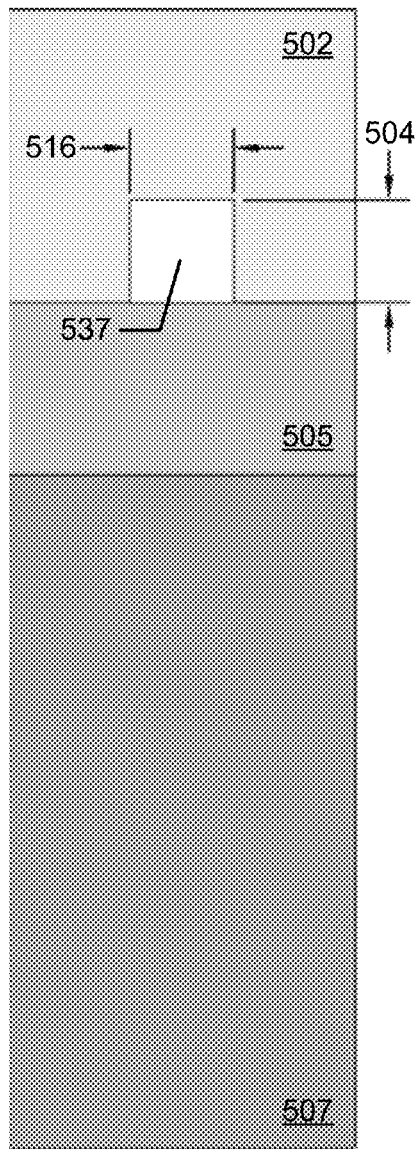
Figure 5E:
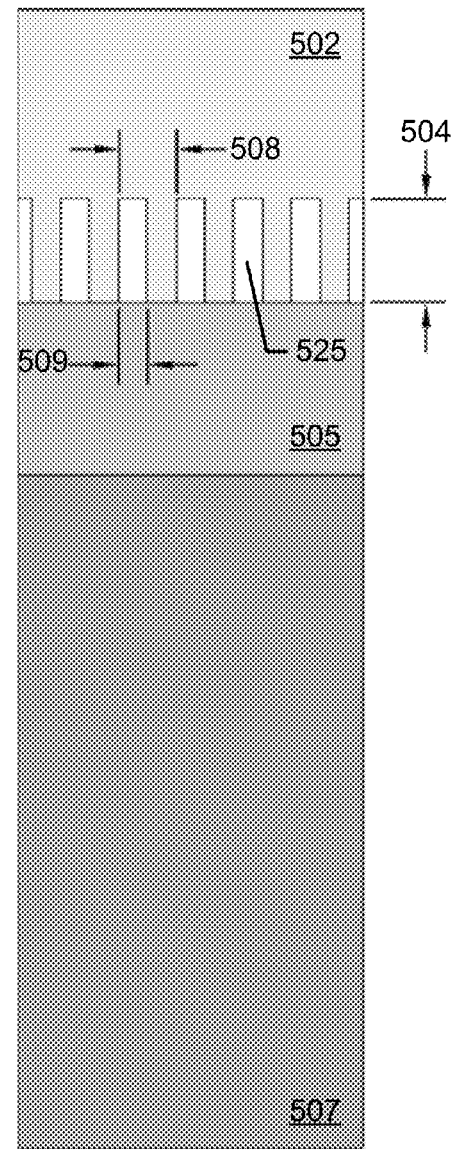
Figure 5F:
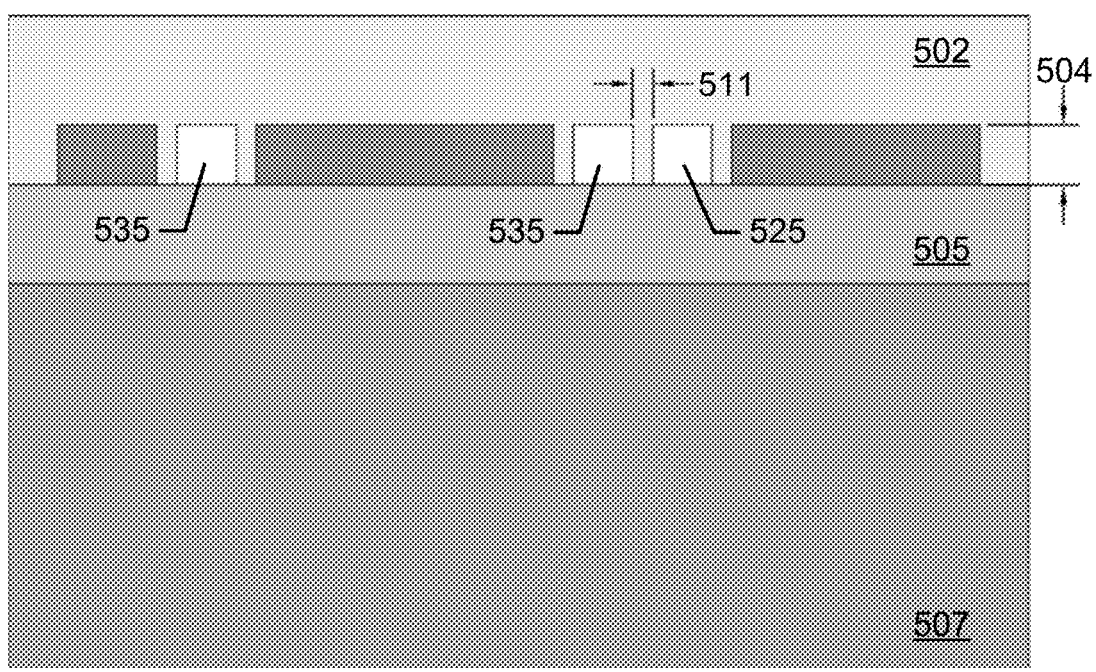
Figure 5G:
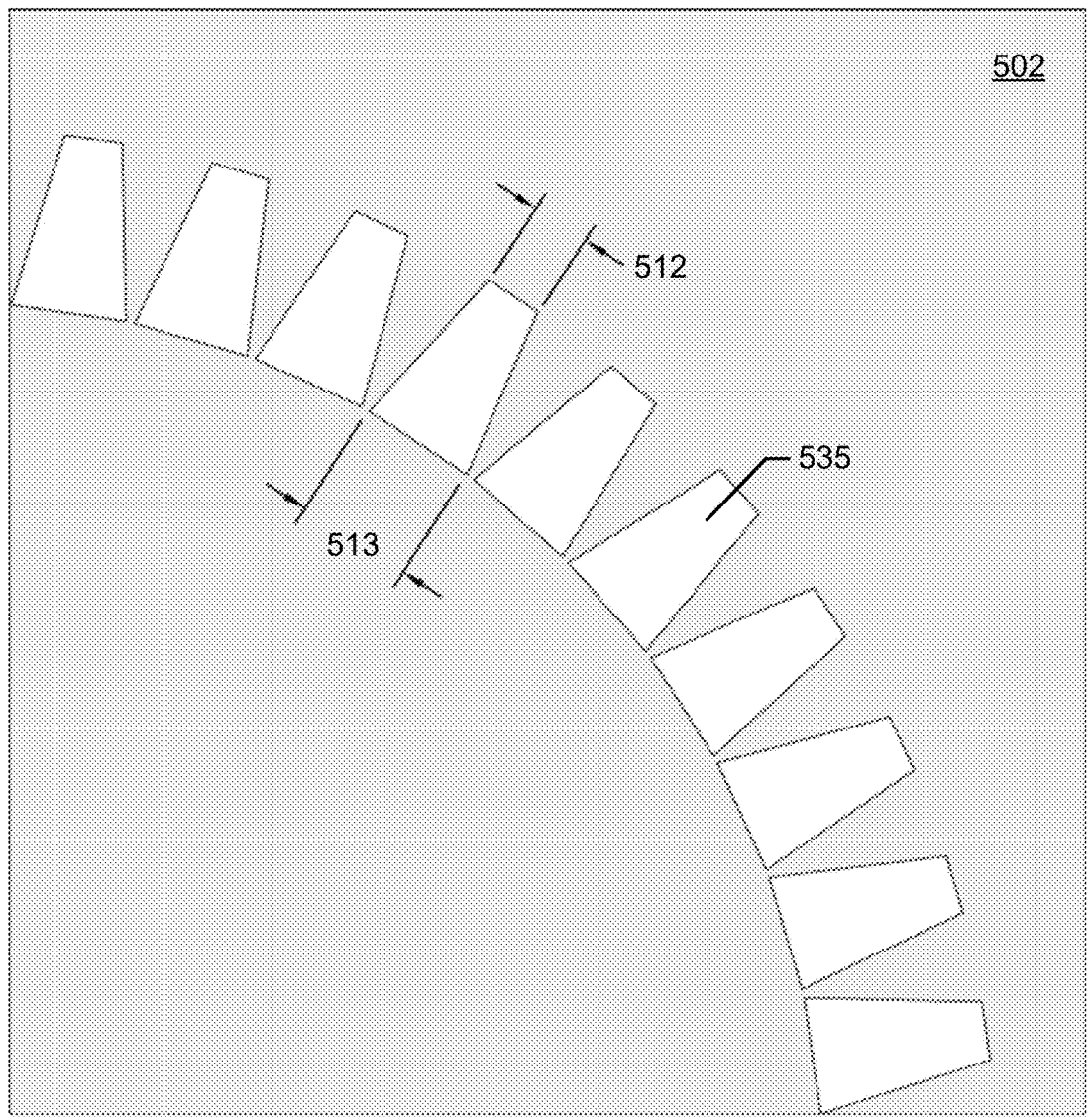
FIG. 5G is a magnified schematic drawing showing a section of the trapezoidal shaped pillar of the ring resonator of the modulator in FIG. 5A.

FIG. 5A is a top view schematic drawing of a hybrid optical modulator based on a subwavelength ring resonator, wherein the hybrid optical modulator is immersed in top cladding material 502 and rests upon bottom cladding 505. FIGS. 5B, 5C, 5D, 5E, and 5F are the cross-sections taken along the dashed lines I-I', J-J', K-K', L-L', and M-M', respectively, of FIG. 5A and FIG. 5G is a magnified schematic drawing showing a section of the trapezoidal shaped pillars of the ring resonator of the modulator in FIG. 5A. The ring resonator is formed by a circular ring of trapezoidal shaped high refractive index dielectric pillars 535 of sufficient height 504 sitting on top of the bottom cladding 505, as illustrated in FIGS. 5A, 5F, and 5G. The whole structure is supported by a substrate 507. The ring resonator 514 is side-coupled to a bus waveguide 520 which is a conventional subwavelength photonic crystal waveguide, with dielectric pillars 525 of period 508, depth 509, and height 504, as illustrated in FIG. 5E. The coupling strength between the bus waveguide and the ring resonator is tuned by the gap 511, as illustrated in FIG. 5F. To achieve a high quality factor, the top width 512 and bottom width 513 of the trapezoidal shaped dielectric pillars 535 are tuned to minimize the loss, as illustrated in FIG. 5G. The coupling strength is adjusted accordingly to meet the coupling requirements and achieve a high quality factor. To facilitate a lossless transition between strip waveguide 522 and subwavelength photonic crystal waveguide 520, an inverse taper 503 with fins of increasing length is adopted. The number of periods, the position, and the length of the fins may be tuned to further enhance the transmission at wavelengths of interest. Subwavelength grating couplers 501 are designed to couple light from optical fibers into the on-chip circuit. The coupling efficiency of the grating coupler may be optimized by tuning the subwavelength grating period 506 and filling factor 517 of the dielectric pillars 547 with a height 504, as illustrated in FIG. 5B. The subwavelength grating couplers 501 have a height 504 and width 510, as illustrated in FIG. 5C. An adiabatic taper 521 is used to bridge the grating coupler regions 501 and the strip waveguides 522. The subwavelength grating coupler has a width 510 around 10 µm and the single mode waveguide 537 has a width 516 around 500 nm and a height 504, as illustrated in FIG. 5C and FIG. 5D, respectively. Materials with high electro-optic coefficient are used as the cladding material 502. These materials include polymers, 2D materials, etc. An electrical signal may be added upon the modulator through two electrodes 519. The electrodes may be put in-plane with the waveguide or on-top of the cladding material. If the electrodes are in-plane, then one electrode will be atop the bottom cladding and within the circular ring of trapezoidal shaped dielectric pillars and another electrode will be atop the bottom cladding and substantially surrounding the circular ring of trapezoidal shaped dielectric pillars. If the electrodes are on-top of the cladding material, one electrode will be within a surface normal projection of the circular ring of trapezoidal shaped dielectric pillars and a second electrode will be substantially surrounding the surface normal projection of the circular ring of trapezoidal shaped dielectric pillars. Essentially as shown in FIG. 5A the electrodes 519 would be positioned the same relative to the ring resonator but would be atop the top cladding instead of the bottom cladding. The modulation is achieved by aligning a single wavelength laser to a resonance wavelength of the resonator 514 and modulating the resonant wavelength using the two metal electrodes 519. The refractive index of the cladding material changes with the external fields and therefore the resonance wavelength shifts. As a result, the output optical intensity changes with the external electrical field. To compensate fabrication error induced resonance shift and environmental temperature variation, an additional electrode 515 may be placed adjacent to the bus waveguide 520 as a heater. The coupling coefficient of the bus waveguide 520 and ring resonator 514 may be adjusted by tuning the temperature through the electrode 515. The ring resonator may also be used as an electromagnetic wave sensor when the electrodes 519 are replaced by antennas.

Figure 6A:
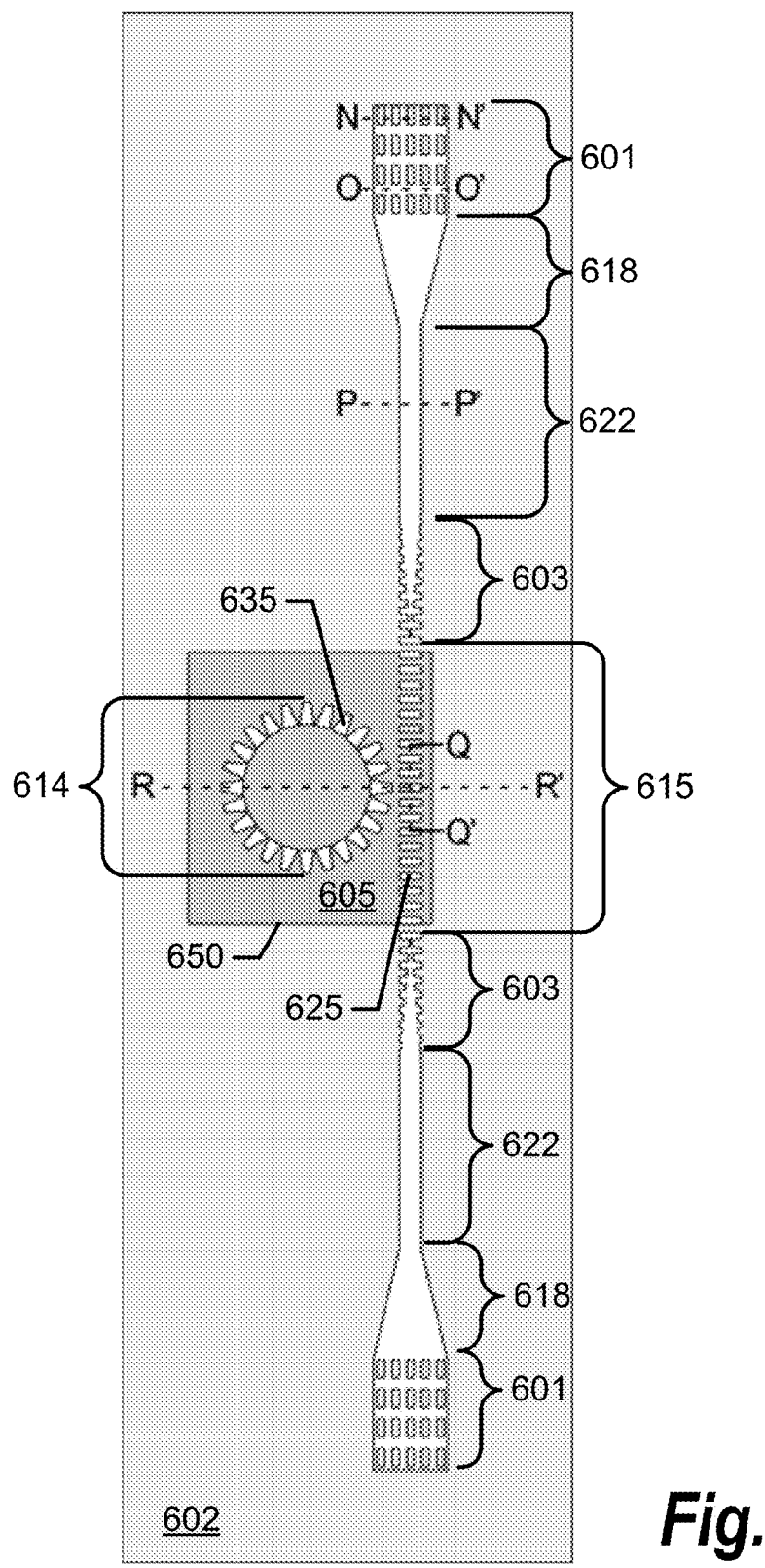
FIG. 6A is a top view schematic drawing of a sensor, in accordance with some embodiments.
Figure 6B:
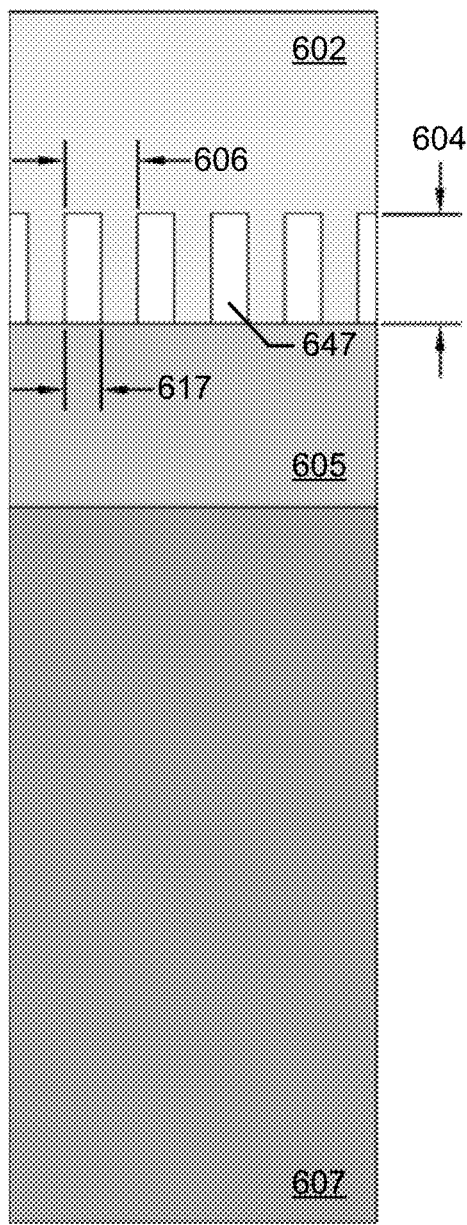
FIGS. 6B-6F are the cross-sections taken along the dashed lines N-N', O-O', P-P', Q-Q', and R-R', respectively, of FIG. 6A.
Figure 6C:
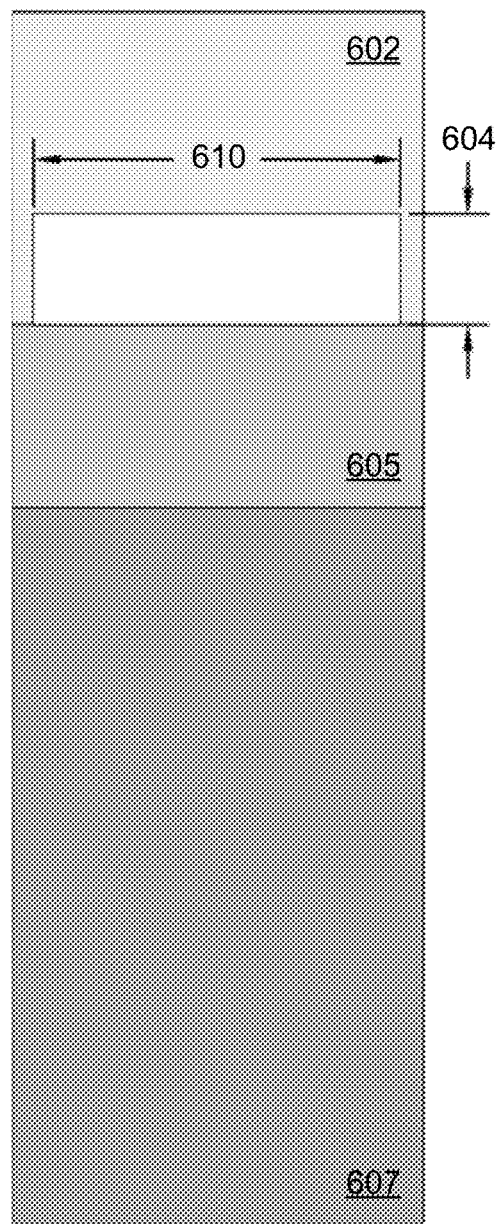
Figure 6D:
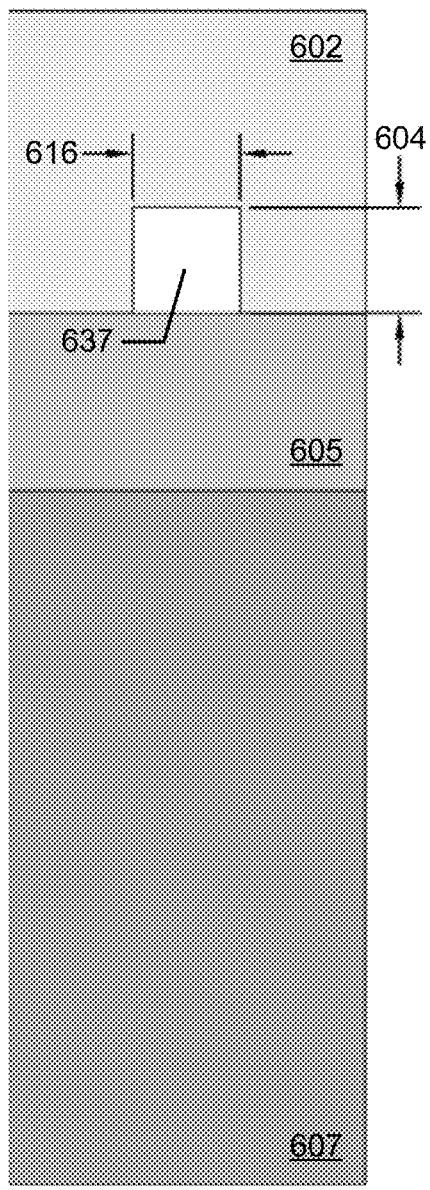
Figure 6E:
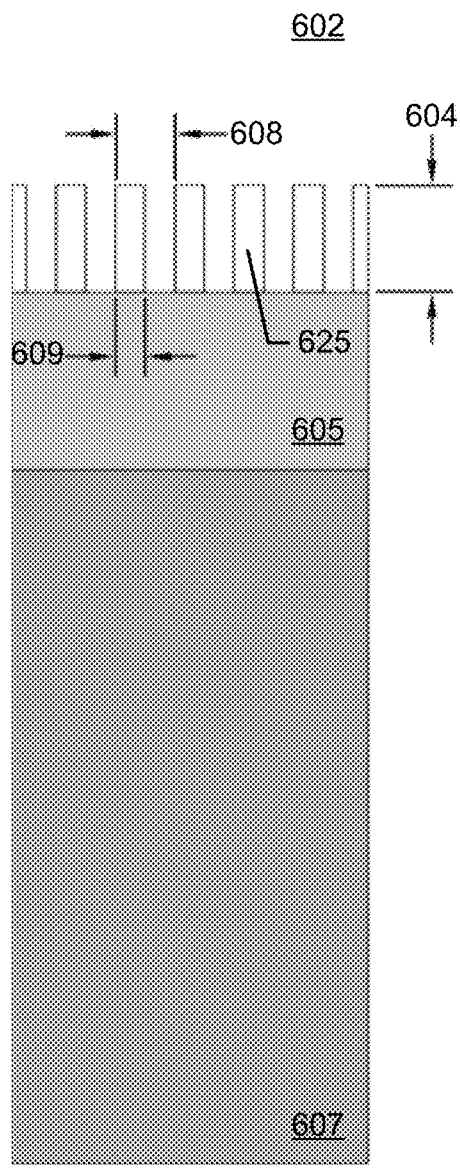
Figure 6F:
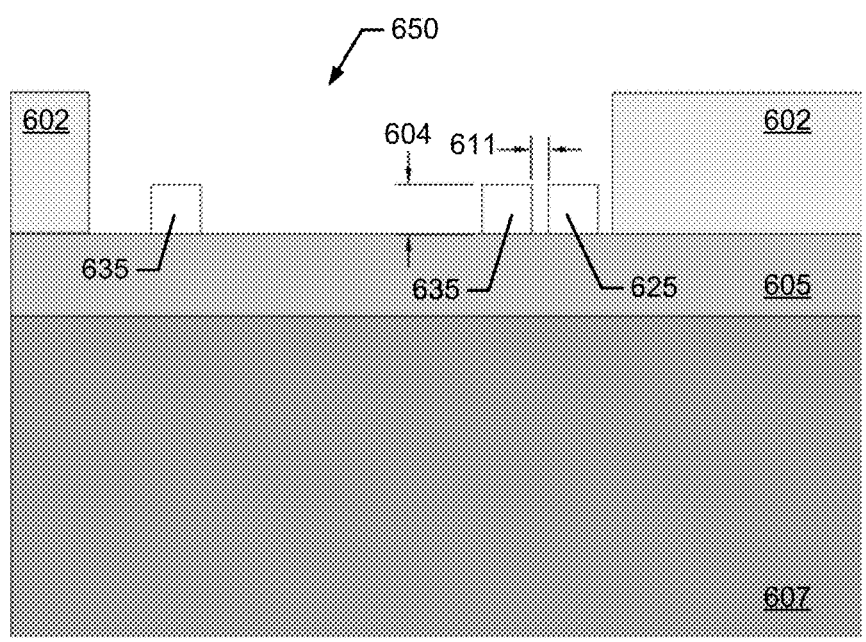
Figure 6G:
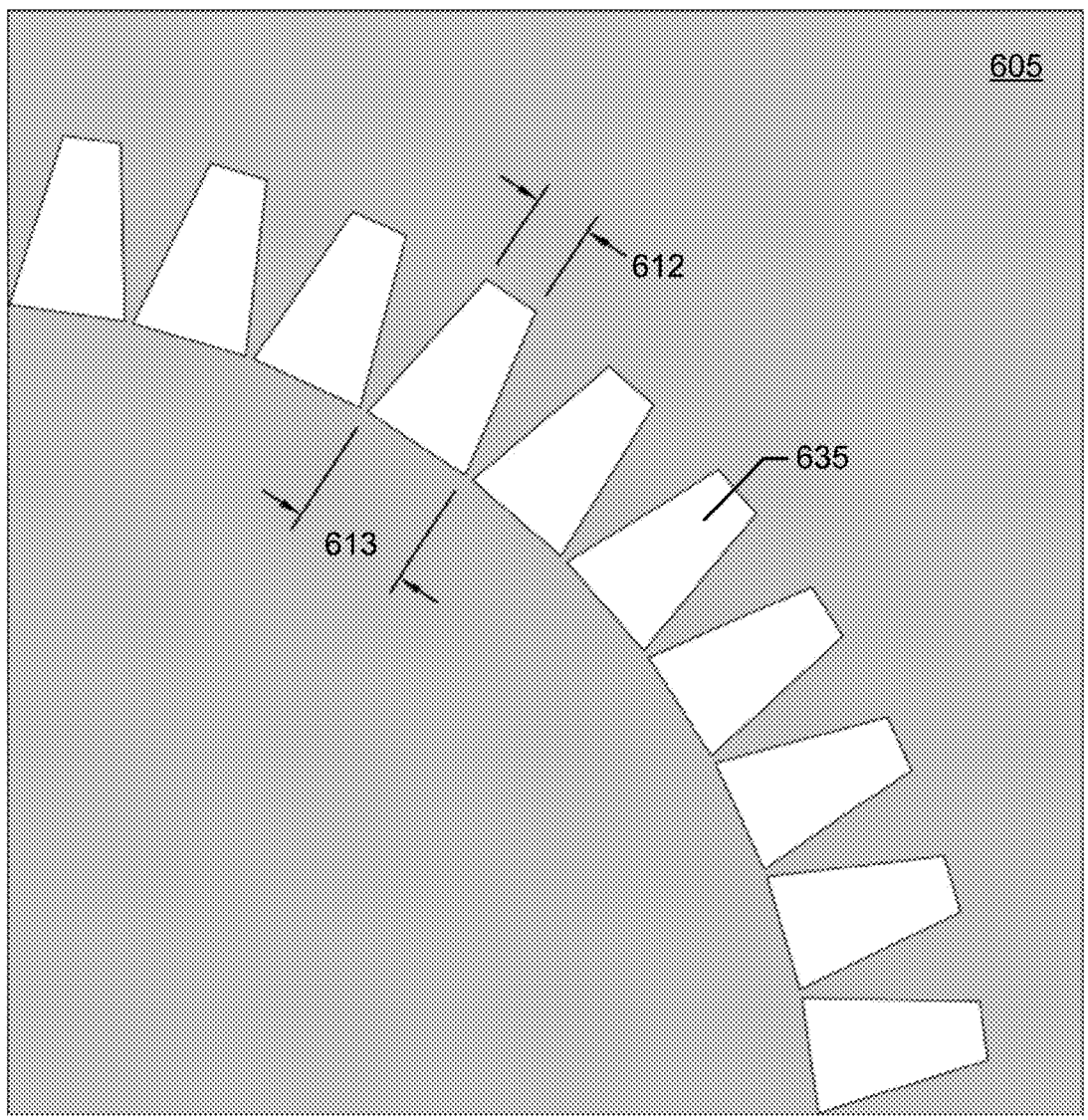
FIG. 6G is a magnified schematic drawing showing a section of the trapezoidal shaped pillar of the ring resonator of the sensor in FIG. 6A.

FIG. 6A is a top view schematic drawing of an ultrasensitive sensor which may be used for chemical detection, spectroscopy, and biosensing, wherein most of the ultrasensitive sensor is immersed in top cladding material 602 with the exception of a window 650 where a chemical or other biomolecule may interact with the ring resonator 614 and bus waveguide 615 of the ultrasensitive sensor. The ultrasensitive sensor rests upon bottom cladding 605. FIGS. 6B, 6C, 6D, 6E, and 6F are the cross-sections taken along the dashed lines N-N', O-O', P-P', Q-Q', and R-R', respectively, of FIG. 6A and FIG. 6G is a magnified schematic drawing showing a section of the trapezoidal shaped pillars of the ring resonator of the ultrasensitive sensor in FIG. 6A. The ring resonator is formed by a circular ring of trapezoidal shaped high refractive index dielectric pillars 635 of sufficient height 604 sitting on top of the bottom cladding 605, as illustrated in FIGS. 6A, 6F, and 6G. The whole structure is supported by a substrate 607. The ring resonator 614 is side-coupled to a bus waveguide 615 which is a conventional subwavelength photonic crystal waveguide, with dielectric pillars 625 of period 608 and depth 609, as illustrated in FIG. 6E. The coupling strength between the bus waveguide and the ring resonator is tuned by the gap 611, as illustrated in FIG. 6F. To achieve a high quality factor, the top width 612 and bottom width 613 of the dielectric pillars are tuned to minimize the loss, as illustrated in FIG. 6G. The coupling strength is adjusted accordingly to meet the coupling requirement and achieve a high quality factor. To facilitate a lossless transition between strip waveguide 622 and subwavelength photonic crystal waveguide 615, an inverse taper 603 with fins of increasing length is adopted. The number of periods, the position, and the length of the fins may be tuned to further enhance the transmission at wavelengths of interest. Subwavelength grating couplers 601 are designed to couple light from optical fibers into the on-chip circuit. The coupling efficiency of the grating coupler may be optimized by tuning the subwavelength grating period 606 and filling factor 617 of the dielectric pillars 647, as illustrated in FIG. 6B. The subwavelength grating couplers 601 have a height 604 and width 610, as illustrated in FIG. 6C. An adiabatic taper 618 is used to bridge the grating coupler regions 601 and the strip waveguides 622. The subwavelength grating coupler has a width 610 around 10 μm and the single mode waveguide 637 has a width 616 around 500 nm and a height 604 around 250 nm, as illustrated in FIG. 6C and FIG. 6D, respectively. The resonance wavelength of the ring resonator shifts in response to the change of the ambient refractive index due to a substance coming in contact with the ring resonator 614 through the window 650. The ultrasensitive sensor may be used to detect organic or inorganic substances such as proteins, DNA, RNA, small molecules, nucleic acids, virus, bacteria, cells, genes, without the use of labels such as fluorescence or radiometry.

As a demonstration of the reduced loss and improved quality factor of the disclosed subwavelength grating ring resonator. Four devices that comprise ring resonators with 10 μm radius based on trapezoidal shaped dielectric pillars and subwavelength photonic crystal waveguides were characterized with different concentrations of glycerol solution. Three of the devices comprise regular rectangular shaped subwavelength photonic crystal waveguides in the ring resonator and one of the devices comprises trapezoidal shaped dielectric pillar based subwavelength photonic crystal waveguides in the ring resonator. All the subwavelength photonic crystal waveguides have a width of 500 nm, a period of 300 nm, a thickness of 250 nm, and a depth of 150 nm. The top and bottom width of the trapezoidal pillars are 140 nm and 210 nm, respectively. The devices are made on an SOI wafer manufactured by Soitec comprising a 250 nm thick top silicon layer (n=3.476) lying on a 3 μm thick buried oxide (BOX, n=1.45) layer. All structures are patterned in a single E-beam lithography step using a JEOL 6000 FSE. The patterns are then transferred into the underneath silicon layer through reactive-ion-etching using a PlasmaTherm 790. Samples with different refractive index were prepared from different concentrations of glycerol-water solutions. Table I lists the refractive indices of glycerol-water solution with glycerol percentage by volume ranging from 0 to 25 percent.

TABLE I

| Absorption peak wavelength of gas molecules. | |
|---|---|
| Glycerol % by volume | Refractive index |
| 0 | 1.33303 |
| 5 | 1.33880 |
| 10 | 1.34481 |
| 15 | 1.35106 |
| 20 | 1.35749 |
| 25 | 1.36404 |

Figure 7A:
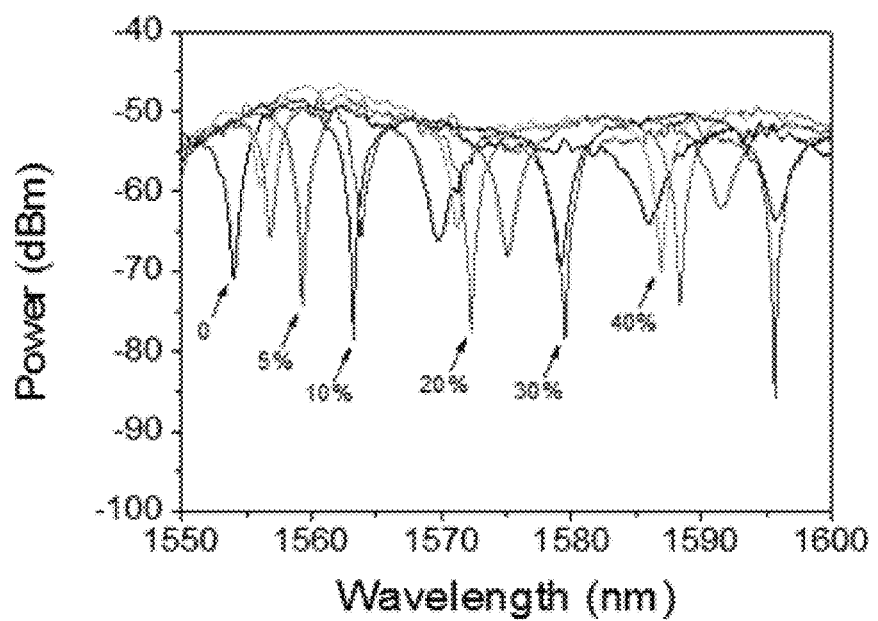
FIG. 7A is a graph showing the transmission spectra of the ring resonator when different concentrations of glycerol are applied.
Figure 7B:
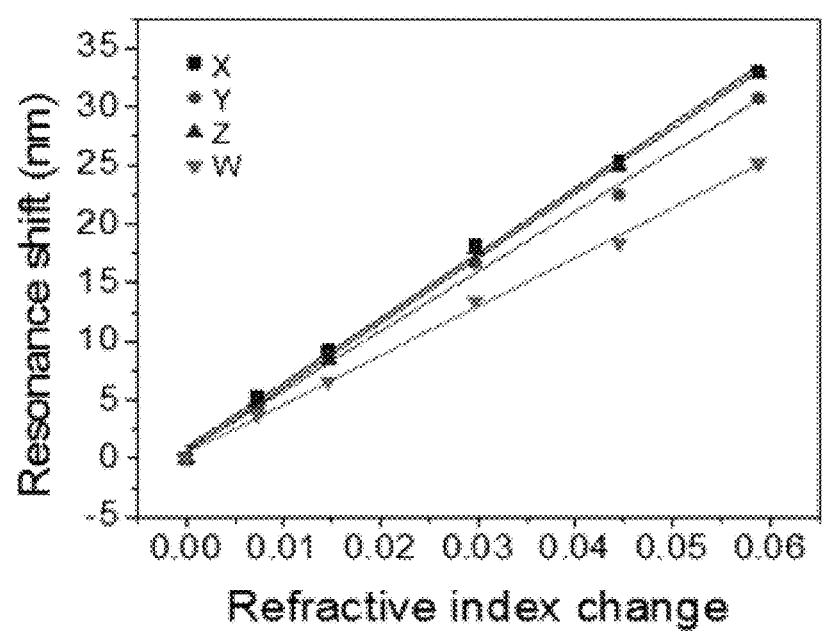
FIG. 7B is a graph showing the resonance shift versus ambient refractive index.

Solutions with different glycerol concentrations were applied on the top of the four ring resonator devices one at a time and the optical spectra were obtained from an optical spectrum analyzer each time. FIG. 7A shows the transmission spectra of one of the four devices from 1550 nm to 1600 nm with different glycerol concentration solutions. The resonance peaks shift to longer wavelength with increasing glycerol concentration (increasing refractive index). Based on the resonance shift obtained from the optical spectra and the corresponding refractive index data listed in Table I, the resonance wavelength shift versus change in refractive index figure is shown in the graph of FIG. 7B. The datasets for X, Y, and Z are for three of the devices with regular rectangular shaped subwavelength photonic crystal waveguides in the ring resonator and the dataset for W is for the device with trapezoidal shaped dielectric pillar based subwavelength photonic crystal waveguides in the ring resonator. Applying a linear fit to the datasets reveals a bulk refractive index sensitivity of approximately 510~550 nm/refractive index unit (RIU) for the devices with regular shaped subwavelength photonic crystal waveguides in the ring resonator and approximately 420 nm/RIU for the device with trapezoidal shaped dielectric pillar based subwavelength photonic crystal waveguides in the ring resonator. Thus disclosing that the trapezoidal shaped dielectric pillar based ring resonator may be used as a fundamental building block for ultrafast and low power consumption all-optical switches, athermal resonators, modulators, and ultrasensitive sensors.

Figure 8A:
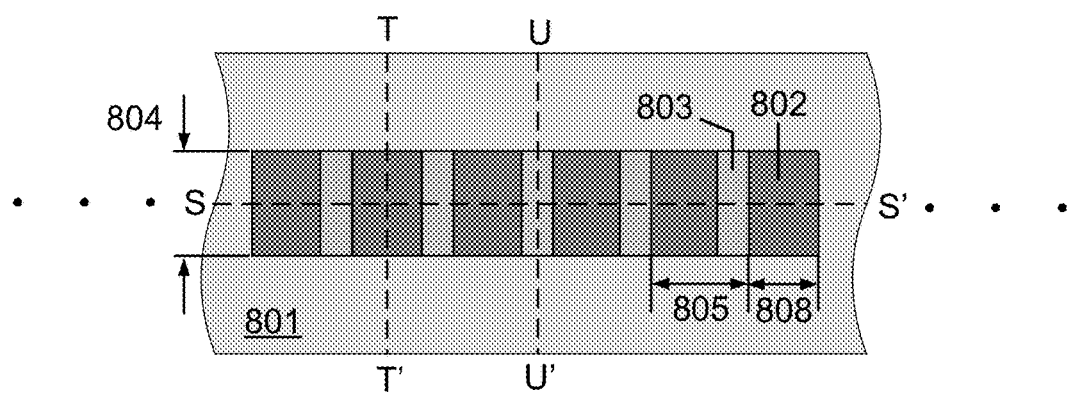
FIG. 8A is a top view schematic drawing of a subwavelength photonic crystal waveguide comprised of a one-dimensional array of two groups of materials in nano- or micro-size shapes, in accordance with some embodiments.

In some embodiments, the subwavelength photonic crystal waveguide may comprise more than one material for the pillars and the pillars may be arbitrarily shaped. FIG. 8A is a top view schematic drawing of a subwavelength photonic crystal waveguide comprised of a one-dimensional array of two groups of pillars in nano- or micro-size shapes. FIGS. 8B-8D are the cross-sections taken along the dashed lines S-S', T-T', and U-U', respectively, of FIG. 8A. FIGS. 8A-8D show that the subwavelength photonic crystal waveguide can be made of a periodic array of two or more groups of materials and shapes 802 and 803. The subwavelength photonic crystal waveguide sits on the substrate 807 and is covered by top cladding 801. In some embodiments, the substrate is a bottom cladding. The macroscopic properties of the waveguide are not only determined by the intrinsic properties of the materials of the pillars, but also by the shape, width 804, height 806, period 805, and the duty cycle which is defined by the depth of one group 808 to the period 805. The two sets of three dots in FIGS. 8A and 8B indicate that the subwavelength photonic crystal waveguide continues with the pattern of materials and shapes of the pillars.

Figure 9A:
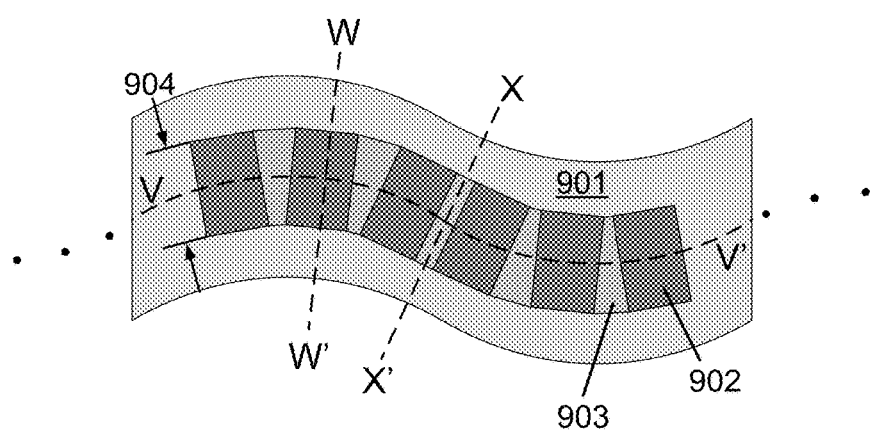
FIG. 9A is a top view schematic drawing of a subwavelength photonic crystal waveguide comprised of a one-dimensional array of two groups of materials in nano- or micro-size shapes along a curve in accordance with some embodiments.

FIG. 9A is a top view schematic drawing of a subwavelength photonic crystal waveguide comprised of a one-dimensional array of two groups of pillars in nano- or micro-size shapes along a curve in accordance with some embodiments. FIGS. 9B-9D are the cross-sections taken along the dashed lines V-V', W-W', and X-X', respectively, of FIG. 9A. FIGS. 9A-9D show that the periodicity of the subwavelength photonic crystal waveguide does not need to be along a straight line or an arc of a circle, but may be along arbitrary curves. Similar to the straight subwavelength photonic crystal waveguide, the curved subwavelength photonic crystal waveguide may be made of a periodic array of two or more groups of materials and shapes 902 and 903. The subwavelength photonic crystal waveguide sits on the substrate 907 and is covered by top cladding 901. In some embodiments, the substrate is a bottom cladding. The macroscopic properties of the waveguide are not only determined by the intrinsic properties of the materials of the pillars, but also by the shape, width 904, height 906, period 905, and the duty cycle which is defined by the depth of one group 908 to the period 905. The two sets of three dots in FIGS. 9A and 9B indicate that the subwavelength photonic crystal waveguide continues with the pattern of materials and shapes of the pillars.

Figure 10A:
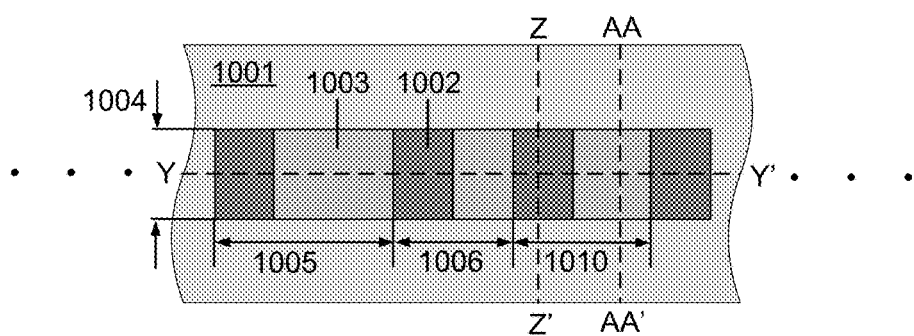
FIG. 10A is a top view schematic drawing of a subwavelength photonic crystal waveguide comprised of a one-dimensional array of two groups of materials in nano- or micro-size shapes in accordance with some embodiments. The array can be a composition of multiple arrays with different periods or even random arrays.

FIG. 10A is a top view schematic drawing of a subwavelength photonic crystal waveguide comprised of a one-dimensional array of two groups of pillars in nano- or micro-size shapes in accordance with some embodiments. The array may be comprised of multiple arrays with different periods or even random arrays. FIGS. 10B-10D are the cross-sections taken along the dashed lines Y-Y', Z-Z', and AA-AA', respectively of FIG. 10A. FIGS. 10A-10D show that for a straight waveguide, the period does not need to be a constant. It can be a combination of multiple periods 1005 and 1006 or even random. Similarly, the subwavelength photonic crystal waveguide may be made of two or more groups of materials and shapes 1002 and 1003. The waveguide sits on the substrate 1007 and is covered by top cladding 1001. In some embodiments, the substrate is a bottom cladding. The macroscopic properties of the waveguide are not only determined by the intrinsic properties of the materials of the pillars, but also by the shape, width 1004, height 1009, periods 1005 and 1006, and the duty cycles, defined by the depth of one group to the period of that group. In FIG. 10B, three duty cycles are illustrated, the depth of the group 1008 to the three different periods 1005, 1006, 1010. The two sets of three dots in FIGS. 10A and 10B indicate that the subwavelength photonic crystal waveguide continues with the pattern of materials and shapes of the pillars.

Figure 11A:
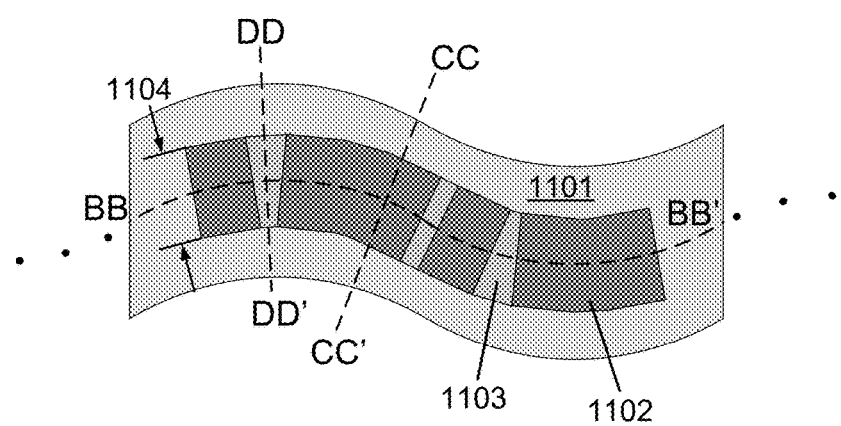
FIG. 11A is a top view schematic drawing of a subwavelength photonic crystal waveguide comprised of a one-dimensional array of two groups of materials in nano- or micro-size shapes along a curve in accordance with some embodiments. The array can be a composition of multiple arrays with different periods or even random arrays.

FIG. 11A is a top view schematic drawing of a subwavelength photonic crystal waveguide comprised of a one-dimensional array of two groups of pillars in nano- or micro-size shapes along a curve in accordance with some embodiments. The array can be a composition of multiple arrays with different periods or even random arrays. FIGS. 11B-11D are the cross-sections taken along the dashed lines BB-BB', CC-CC', and DD-DD', respectively, of FIG. 11A. FIGS. 11A-11D show that for a curved waveguide, the period does not need to be a constant. It can be a combination of multiple periods 1105 and 1106 or even random. Similarly, the subwavelength photonic crystal waveguide may be made of two or more groups of materials and shapes 1102 and 1103. The waveguide sits on the substrate 1107 and is covered by top cladding 1101. In some embodiments, the substrate is a bottom cladding. The macroscopic properties of the waveguide are not only determined by the intrinsic properties of the materials of the pillars, but also by the shape, width 1104, height 1110, period 1105 and 1106, and the duty cycles, defined by the depth of one group 1108 to the period 1105 and the depth of another group 1109 to the other period 1106. The two sets of three dots in FIGS. 11A and 11B indicate that the subwavelength photonic crystal waveguide continues with the pattern of materials and shapes of the pillars.

Figure 12A:
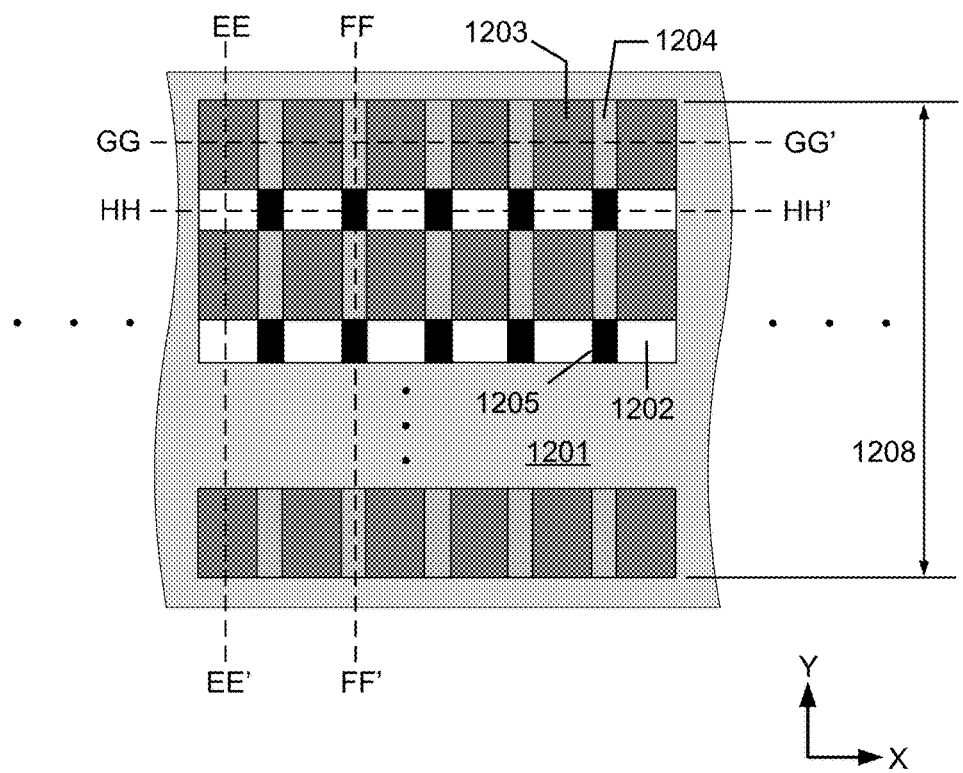
FIG. 12A is a top view schematic drawing of a subwavelength photonic crystal waveguide comprised of a two dimensional array of several groups of materials in nano- or micro-size shapes in accordance with some embodiments.
Figure 12B:
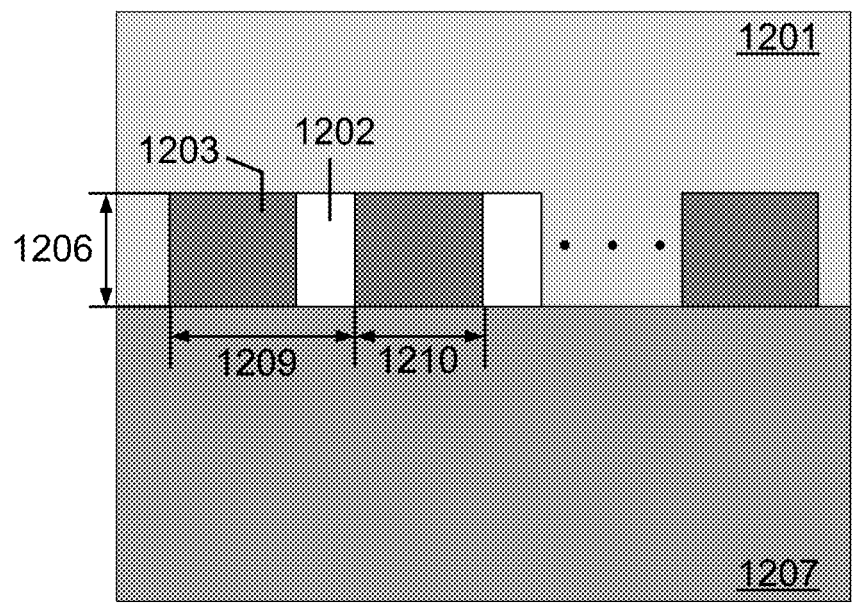
FIGS. 12B-12E are the cross-sections taken along the dashed lines EE-EE', FF-FF', GG-GG', and HH-HH', respectively, of FIG. 12A.
Figure 12C:
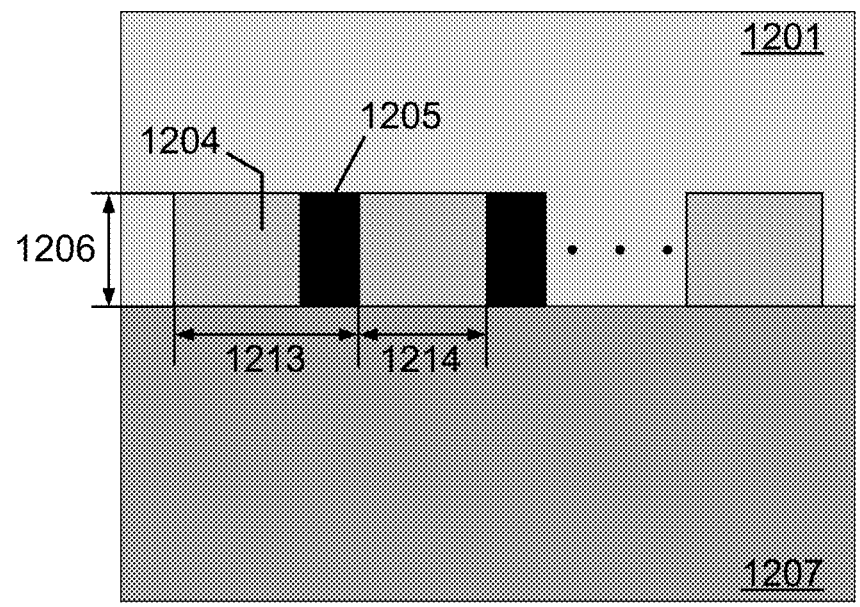
Figure 12D:
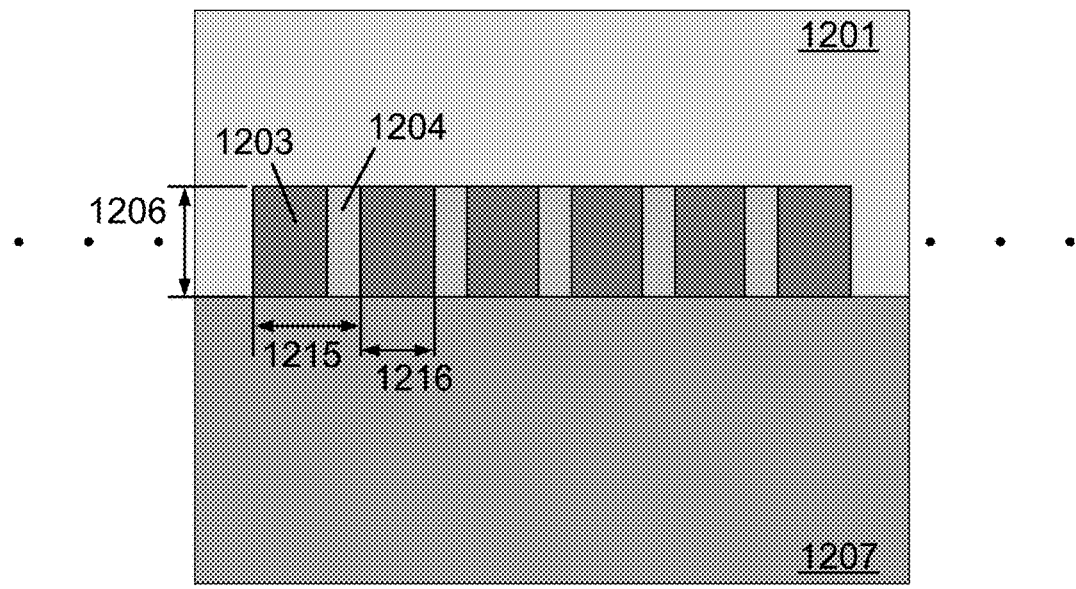
Figure 12E:
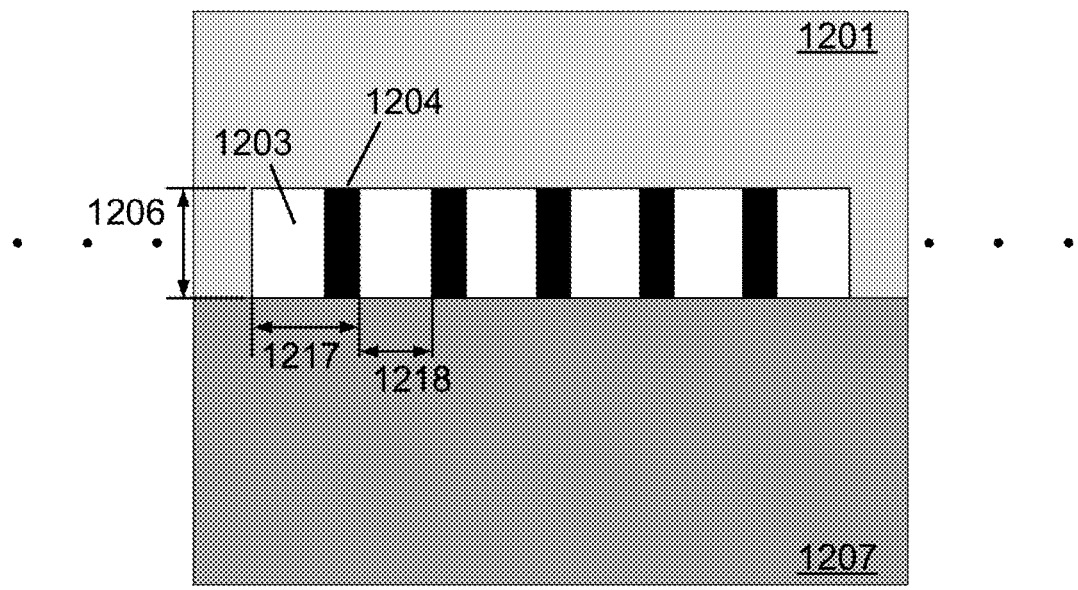

The subwavelength photonic crystal waveguide may also comprise two-dimensional structures, as shown in FIGS. 12A-12E. FIG. 12A is a top view schematic drawing of a subwavelength photonic crystal waveguide comprised of a two dimensional array of several groups of pillars in nano- or micro-size shapes in accordance with some embodiments. FIGS. 12B-12E are the cross-sections taken along the dashed lines EE-EE', FF-FF', GG-GG', and HH-HH', respectively, of FIG. 12A. The three sets of three dots in FIG. 12A indicate that the subwavelength photonic crystal waveguide continues with the pattern of materials and shapes of the pillars along the x-axis and the y-axis. The sets of three dots in FIGS. 12B, 12C, 12D, and 12E indicate that the pattern of materials and shapes of the pillars of the subwavelength photonic crystal waveguide continues and/or is repeated. The subwavelength photonic crystal waveguide structure sits on the substrate 1207 and is covered by top cladding 1201. In some embodiments, the substrate is a bottom cladding. The periods along the x-axis, 1215 and 1217, and along the y-axis, 1209 and 1213, may be either a constant or a combination of multiple periods or even random. In addition to the four different materials of the pillars, 1202, 1203, 1204, and 1205, that comprise the subwavelength photonic crystal waveguide, the macroscopic properties of the subwavelength photonic crystal waveguide may also be tuned through the shape, width 1208, height 1206, periods along the x-axis, 1215 and 1217, periods along the y-axis, 1209 and 1213, and the duty cycles, defined by the depth of the groups 1210, 1214, 1216, and 1218, to the periods 1209, 1213, 1215, and 1217, respectively.

Figure 13A:
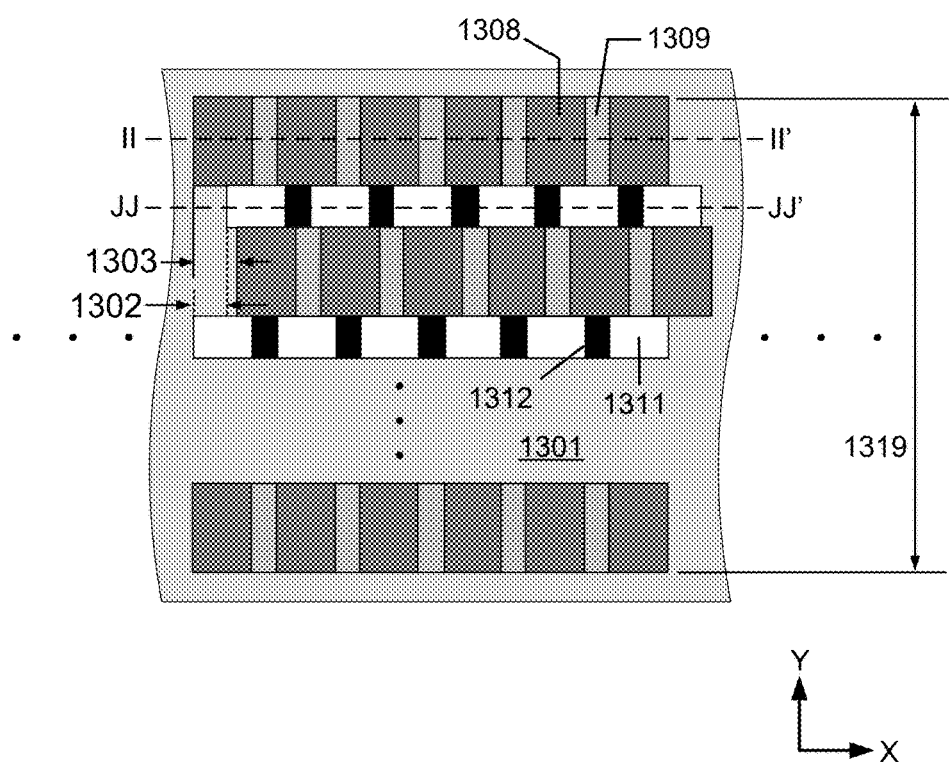
FIG. 13A is a top view schematic drawing of a subwavelength photonic crystal waveguide comprised of a two dimensional array of several groups of materials in nano- or micro-size shapes, in accordance with some embodiments. The array can be a composition of multiple arrays with different periods or even random arrays.
Figure 13B:
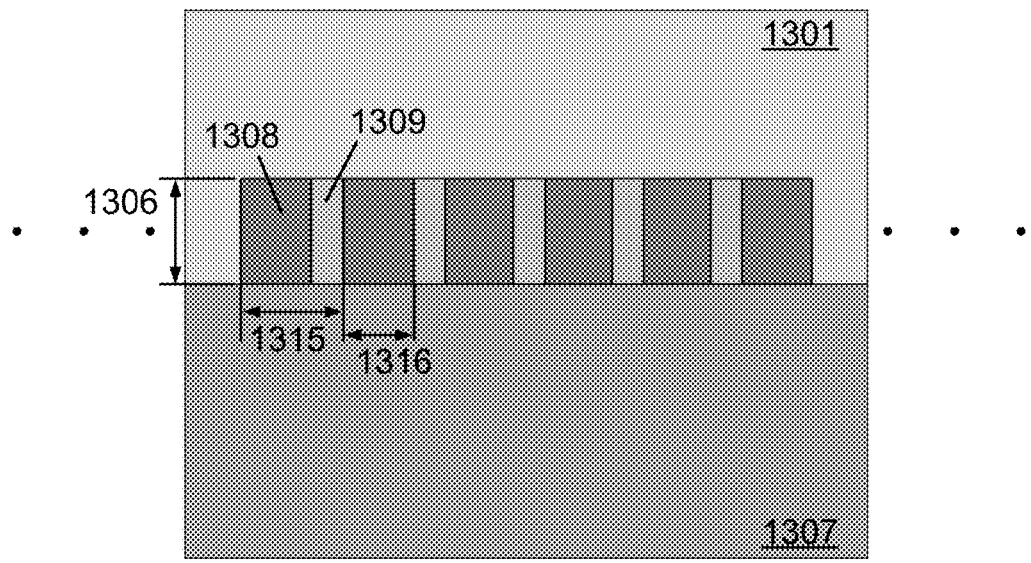
FIGS. 13B and 13C are the cross-sections taken along the dashed lines II-II' and JJ-JJ', respectively, of FIG. 13A.
Figure 13C:
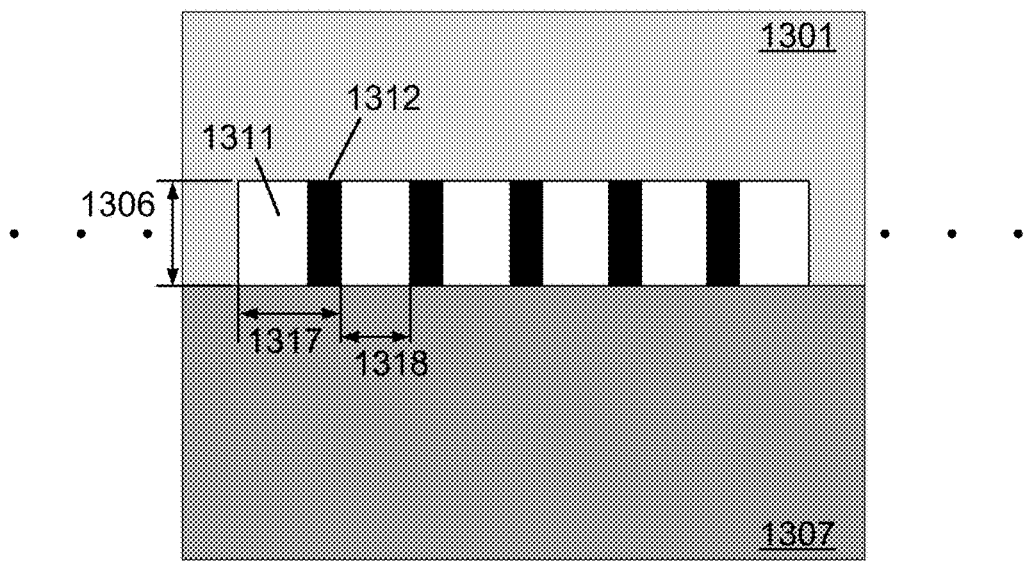

In addition, the material groups may be dislocated relative to each other to engineer the overall optical properties of the subwavelength photonic crystal waveguide. FIG. 13A is a top view schematic drawing of a subwavelength photonic crystal waveguide comprised of a two dimensional array of several groups of pillars in nano- or micro-size shapes, in accordance with such an embodiment. The array can be a composition of multiple arrays with different periods or even random arrays. FIGS. 13B and 13C are the cross-sections taken along the dashed lines II-II' and JJ-JJ', respectively, of FIG. 13A. The three sets of three dots in FIG. 13A indicate that the subwavelength photonic crystal waveguide continues with the pattern of materials and shapes of the pillars along the x-axis and the y-axis. The sets of three dots in FIGS. 13B and 13C indicate that the pattern of materials and shapes of the pillars of the subwavelength photonic crystal waveguide continues and/or is repeated. In FIG. 13A, the row of pillars 1308 and 1309 along the x-axis are offset 1303 from an adjacent row of similar pillars and the row of pillars 1311 and 1312 along the x-axis are offset 1302 from an adjacent row of similar pillars. Similarly, the subwavelength photonic crystal waveguide is covered by top cladding 1301 and sits on the substrate 1307. In some embodiments, the substrate is a bottom cladding. The macroscopic properties of the waveguide may also be tuned through the shape, width 1319, height 1306, periods 1315 and 1317, and the duty cycles, defined by the depth of the groups 1316 and 1318 to the periods 1315 and 1317, respectively.

Figure 14A:
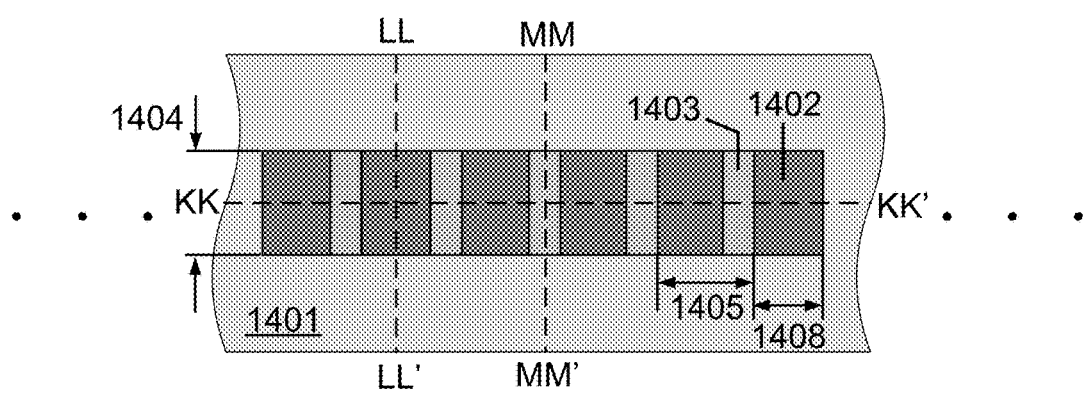
FIG. 14A is a top view schematic drawing of a subwavelength photonic crystal waveguide comprised of a one-dimensional array of two groups of materials in nano- or micro-size shapes, in accordance with some embodiments. The groups of materials can have different heights.

In some embodiments, the groups of pillars that form the subwavelength photonic crystal waveguide may have different heights. FIG. 14A is a top view schematic drawing of a subwavelength photonic crystal waveguide comprised of a one-dimensional array of two groups of pillars in nano- or micro-size shapes, in accordance with such an embodiment.

Figure 14B:
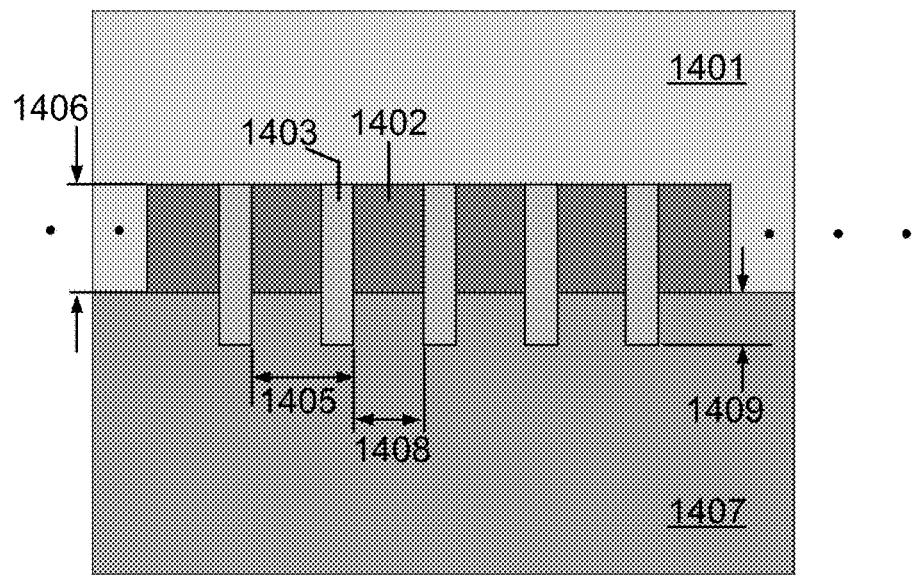
FIGS. 14B-14D are the cross-sections taken along the dashed lines KK-KK', LL-LL', and MM-MM', respectively, of FIG. 14A.
Figure 14C:
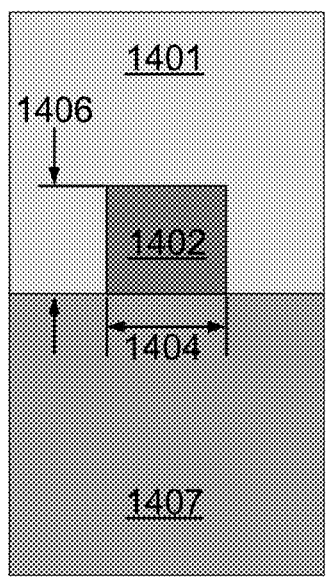
Figure 14D:
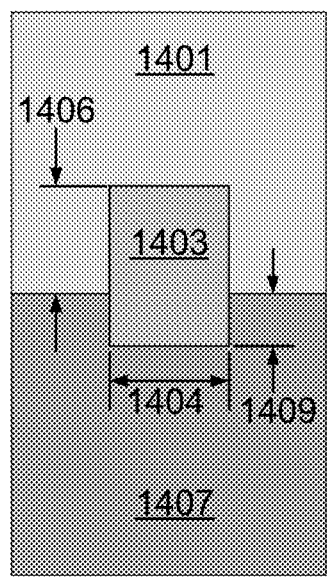
Figure 15A:
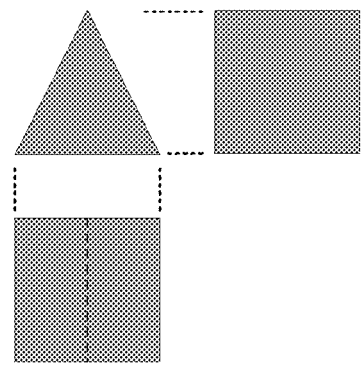
FIGS. 15A-15K illustrate a few of the possible 3D shapes that may be used in the subwavelength photonic crystal waveguide.
Figure 15D:
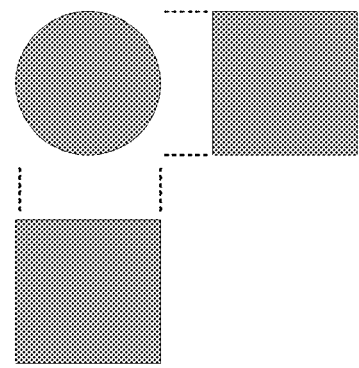
Figure 15B:
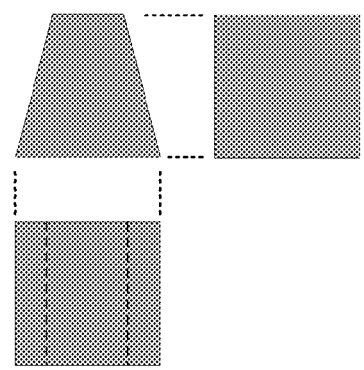
Figure 15E:
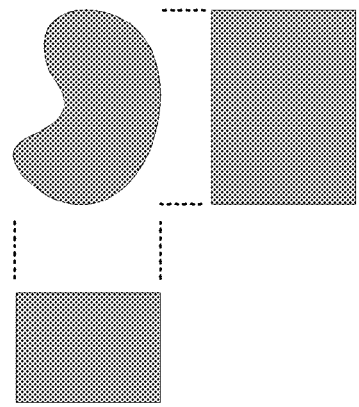
Figure 15C:
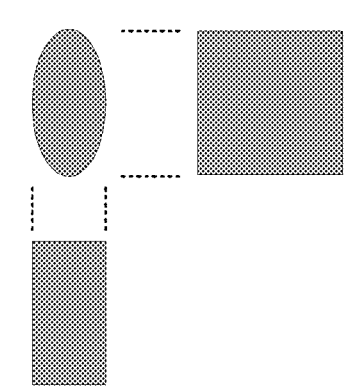
Figure 15F:
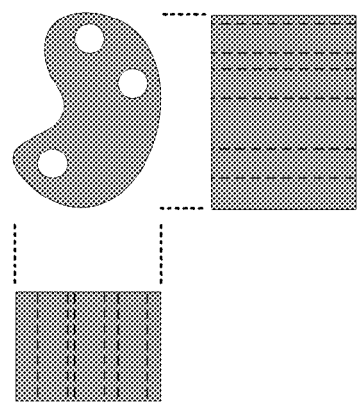
Figure 15G:
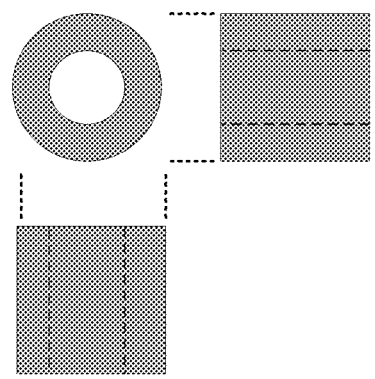
Figure 15J:
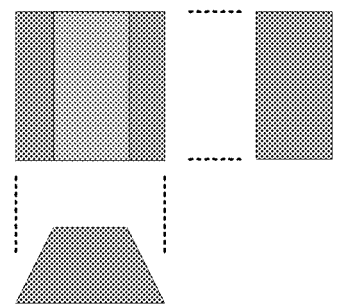
Figure 15H:
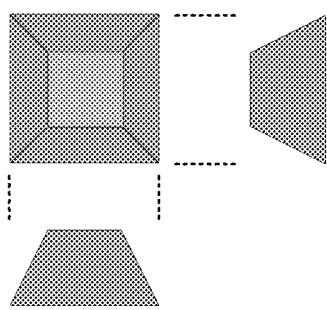
Figure 15K:
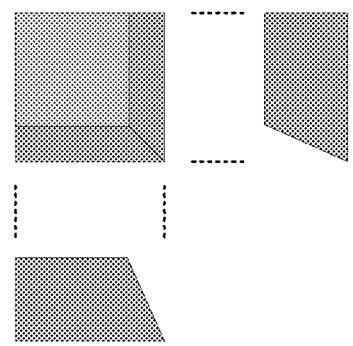
Figure 15I:
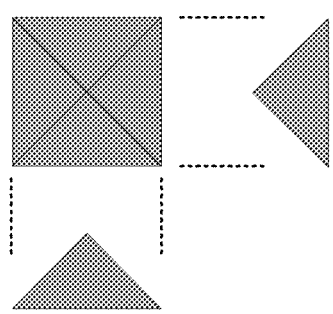

FIGS. 14B-14D are the cross-sections taken along the dashed lines KK-KK', LL-LL', and MM-MM', respectively, of FIG. 14A. FIGS. 14A-14D show that the subwavelength photonic crystal waveguide can be made of a periodic array of two or more groups of materials and shapes 1402 and 1403 where pillar 1403 is partially embedded into the substrate 1407. In this embodiment, pillar 1403 extends down into the substrate 1407 by a distance 1409 relative to the interface between the substrate 1407 and the cladding 1401. The subwavelength photonic crystal waveguide sits on the substrate 1407 and is covered by top cladding 1401. In some embodiments, the substrate is a bottom cladding. The macroscopic properties of the waveguide are not only determined by the intrinsic properties of the materials of the pillars, but also by the shape, width 1404, height 1406, period 1405, and the duty cycle which is defined by the depth of one group 1408 to the period 1405. The two sets of three dots in FIGS. 14A and 14B indicate that the subwavelength photonic crystal waveguide continues with the pattern of materials and shapes of the pillars. Similar to the subwavelength photonic crystal waveguides of FIGS. 8 and 9, the one dimensional array of two more interleaved dielectric materials may be substantially linear or curved. Additionally, the two-dimensional arrays disclosed in FIGS. 12 and 13 may also comprise dielectric pillars partially embedded into the substrate.

The pillars that comprise the subwavelength photonic crystal waveguide may comprise many different shapes. FIGS. 15A-15K illustrate a few of the possible 3D shapes that may be used in the subwavelength photonic crystal waveguide. FIGS. 15A-15K each show the top view as well as the two side views of a triangular prism, a trapezoidal prism, an elliptic cylinder, a cylinder, an arbitrary shaped cylinder, an arbitrary shaped cylinder with voids, a tube, a frustum, a pyramid, a trapezoidal prism, and an asymmetric frustum, respectively, in accordance with some embodiments.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions, and improvements to the embodiments described above are possible. It is contemplated that these variations, modifications, additions and improvements fall within the scope of the invention as detailed within the following claims.

The invention claimed is:

1. An optical system comprising:
   a substrate; and
   a subwavelength photonic crystal single mode waveguide atop the substrate,
   wherein the subwavelength photonic crystal single mode waveguide comprises a one-dimensional array of two or more periods of dielectric pillars, wherein each period of the two or more periods of dielectric pillars comprises two or more dielectric pillars, wherein the dielectric pillars of the two or more dielectric pillars comprise different materials.

2. The optical system of claim 1, wherein the periods of the two or more periods of dielectric pillars are constant.

3. The optical system of claim 1, wherein the periods of the two or more periods of dielectric pillars are a combination of two or more periods.

4. The optical system of claim 1, wherein the periods of the two or more periods of dielectric pillars are random.

5. The optical system of claim 1, further comprising a top cladding atop the subwavelength photonic crystal single mode waveguide and the substrate.

6. The optical system of claim 1, wherein at least one of the two or more dielectric pillars of each period of the two or more periods of dielectric pillars is partially embedded into the substrate.

7. The optical system of claim 1, wherein the one-dimensional array of two or more periods of dielectric pillars is substantially linear.

8. The optical system of claim 1, wherein the one-dimensional array of two or more periods of dielectric pillars is curved.

9. The optical system of claim 1, wherein each of the pillars of the two or more dielectric pillars is at least one of a triangular prism, a trapezoidal prism, an elliptic cylinder, a cylinder, a tube, a frustum, a pyramid, a trapezoidal prism, and an asymmetric frustum.

10. The optical system of claim 1, wherein the substrate is a bottom cladding.

11. The optical system of claim 1, wherein each of the pillars of the two or more dielectric pillars comprises a solid, liquid, and/or gas.

12. An optical system comprising:
    a substrate; and
    a subwavelength photonic crystal single mode waveguide atop the substrate,
    wherein the subwavelength photonic crystal single mode waveguide comprises a two-dimensional array of four or more periods of dielectric pillars, wherein each period of the four or more periods of dielectric pillars comprises two or more dielectric pillars, wherein the dielectric pillars of the two or more dielectric pillars comprise different materials.

13. The optical system of claim 12, wherein the periods of the four or more periods of dielectric pillars are constant.

14. The optical system of claim 12, wherein the periods of the four or more periods of dielectric pillars are a combination of two or more periods.

15. The optical system of claim 12, wherein the periods of the four or more periods of dielectric pillars are random.

16. The optical system of claim 12, further comprising a top cladding atop the subwavelength photonic crystal single mode waveguide and the substrate.

17. The optical system of claim 12, wherein at least one of the two or more dielectric pillars of each period of the four or more periods of dielectric pillars is partially embedded into the substrate.

18. The optical system of claim 12, wherein the two-dimensional array of four or more periods of dielectric pillars is substantially linear.

19. The optical system of claim 12, wherein the two-dimensional array of four or more periods of dielectric pillars is curved.

20. The optical system of claim 12, wherein each of the pillars of the two or more dielectric pillars is at least one of a triangular prism, a trapezoidal prism, an elliptic cylinder, a cylinder, a tube, a frustum, a pyramid, a trapezoidal prism, and an asymmetric frustum.

21. The optical system of claim 12, wherein the substrate is a bottom cladding.

22. The optical system of claim 12, wherein each of the pillars of the two or more dielectric pillars comprises a solid, liquid, and/or gas.

\* \* \* \* \*